United States Patent
Ray et al.

(10) Patent No.: US 8,806,424 B1
(45) Date of Patent: Aug. 12, 2014

(54) SYSTEM FOR LINKING PROCESS ARCHITECTURES TO TECHNOLOGY ARCHITECTURES

(75) Inventors: Subhashish Ray, Mumbai (IN); Senthil Ramani, Bangalore (IN)

(73) Assignee: Accenture Global Services Limited, Dublin (IE)

(*) Notice: Subject to any disclaimer, the term of this patent is extended or adjusted under 35 U.S.C. 154(b) by 541 days.

(21) Appl. No.: 12/970,324

(22) Filed: Dec. 16, 2010

Related U.S. Application Data

(60) Provisional application No. 61/326,065, filed on Apr. 20, 2010.

(51) Int. Cl.
*G06F 9/44* (2006.01)

(52) U.S. Cl.
USPC ............ 717/104; 717/102; 717/121; 717/162

(58) Field of Classification Search
CPC .............. G06F 8/30; G06F 8/61; G06F 8/65; G06F 8/71
See application file for complete search history.

(56) References Cited

U.S. PATENT DOCUMENTS

| | | | | |
|---|---|---|---|---|
| 8,312,419 B2* | 11/2012 | Wilcock et al. | ............... | 717/104 |
| 8,429,597 B2* | 4/2013 | Prigge | ............ | 717/104 |
| 8,677,339 B2* | 3/2014 | Joukov et al. | ................. | 717/162 |
| 8,707,261 B2* | 4/2014 | Heller et al. | .................. | 717/121 |
| 2002/0196737 A1* | 12/2002 | Bullard | ......................... | 370/231 |
| 2010/0023920 A1* | 1/2010 | Chaar et al. | ................... | 717/102 |
| 2010/0054156 A1* | 3/2010 | DeHaan | ........................ | 370/255 |
| 2011/0055802 A1* | 3/2011 | Von Unwerth et al. | ....... | 717/104 |
| 2012/0185821 A1* | 7/2012 | Yaseen et al. | ................. | 717/105 |

OTHER PUBLICATIONS

Bellas et al., Mapping streaming architectures on reconfigurable platforms, Jun. 2007, 7 pages.*

* cited by examiner

*Primary Examiner* — Thuy Dao
(74) *Attorney, Agent, or Firm* — Brinks Gilson & Lione

(57) ABSTRACT

Systems and methods for linking process architectures to technology architectures greatly reduces the time and cost associated with common changing business requirements. The design's robust features allows for simplified integration and management to changing business processes and needs. The system incorporates a method of integrating changing business processes with current and up to date technological systems without having to start over every time a new business process is introduced or a new technology or technology upgrade takes place.

25 Claims, 40 Drawing Sheets

| | PROCESS | | | | | | | | | Technology | | |
|---|---|---|---|---|---|---|---|---|---|---|---|---|
| L0 | Platform (L0) | L1 | Capability Area (L1) | L2 | Capability (L2) | L3 | Process (L3) | L4 | Sub-Process/ Activity (L4) | Technology/ AAES Process | Technology/ AAES Subprocess | Map to Process level |
| 2 | Value Chain | 2.2 | Source and Prepare Raw Materials | 2.2.2 | Conduct Raw Material Sourcing | 2.2.2.2 | Check Consumption History and Inventory Procedures | 2.2.2.2.1 | Evaluate consumption history by item | | | |
| 2 | Value Chain | 2.2 | Source and Prepare Raw Materials | 2.2.2 | Conduct Raw Material Sourcing | 2.2.2.2 | Check Consumption History and Inventory Procedures | 2.2.2.2.2 | Check inventory procedures, constrains, resourcing points | | | |
| 2 | Value Chain | 2.2 | Source and Prepare Raw Materials | 2.2.2 | Conduct Raw Material Sourcing | 2.2.2.3 | Analyze sourcing options | 2.2.2.3.1 | Verify current contracts by item | | | |
| 2 | Value Chain | 2.2 | Source and Prepare Raw Materials | 2.2.2 | Conduct Raw Material Sourcing | 2.2.2.3 | Analyze sourcing options | 2.2.2.3.2 | Define sourcing modes (shipping, rails, trucks) and potential suppliers | | | |
| 2 | Value Chain | 2.2 | Source and Prepare Raw Materials | 2.2.2 | Conduct Raw Material Sourcing | 2.2.2.3 | Analyze sourcing options | 2.2.2.3.3 | Analyze pile and inventory levels, estimated consumption and procurement needs | | | |
| 2 | Value Chain | 2.2 | Source and Prepare Raw Materials | 2.2.2 | Conduct Raw Material Sourcing | 2.2.2.3 | Analyze sourcing options | 2.2.2.3.4 | Establish procurement timeline and responsibilities | | | |

Fig. 28B

| | | | PROCESS | | | | | Technology | | |
|---|---|---|---|---|---|---|---|---|---|---|
| L0 | Platform (L0) | L1 | Capability Area (L1) | L2 | Capability (L2) | L3 | Process (L3) | L4 | Sub-Process/ Activity (L4) | Technology/ AAES Process | Technology/ AAES Subprocess | Map to Process level |

| L0 | Platform (L0) | L1 | Capability Area (L1) | L2 | Capability (L2) | L3 | Process (L3) | L4 | Sub-Process/ Activity (L4) | Technology/ AAES Process | Technology/ AAES Subprocess | Map to Process level |
|---|---|---|---|---|---|---|---|---|---|---|---|---|
| 2 | Value Chain | 2.2 | Source and Prepare Raw Materials | 2.2.2 | Conduct Raw Material Sourcing | 2.2.2.3 | Analyze sourcing options | 2.2.2.3.5 | Check logistics, quality and other related constraints | | | |
| 2 | Value Chain | 2.2 | Source and Prepare Raw Materials | 2.2.2 | Conduct Raw Material Sourcing | 2.2.2.3 | Analyze sourcing options | 2.2.2.3.6 | Trigger interaction with suppliers (RFI, RFP, Contract Renewal, etc.) | | | |
| 2 | Value Chain | 2.2 | Source and Prepare Raw Materials | 2.2.2 | Conduct Raw Material Sourcing | 2.2.2.3 | Analyze sourcing options | 2.2.2.3.7 | Conduct high level optimization of raw material burden by considering projected costs of delivered raw materials and the associated cost of conversion - as required iterate back to Develop Raw Materials Plan | | | |
| 2 | Value Chain | 2.2 | Source and Prepare Raw Materials | 2.2.2 | Conduct Raw Material Sourcing | 2.2.2.4 | Conduct Procurement | 2.2.2.4.1 | Define procurement targets by item (quantities, target price, quality, timeline) | Procurement Planning | Procurement Planning of Raw Materials | L2 |
| 2 | Value Chain | 2.2 | Source and Prepare Raw Materials | 2.2.2 | Conduct Raw Material Sourcing | 2.2.2.4 | Conduct Procurement | 2.2.2.4.2 | Select suppliers and/or contracts | | | |
| 2 | Value Chain | 2.2 | Source and Prepare Raw Materials | 2.2.2 | Conduct Raw Material Sourcing | 2.2.2.4 | Conduct Procurement | 2.2.2.4.3 | Conduct negotiation | | | |

Fig. 28C

| PROCESS | | | | | | | | | Technology | | |
|---|---|---|---|---|---|---|---|---|---|---|---|
| L0 | Platform (L0) | L1 | Capability Area (L1) | L2 | Capability (L2) | L3 | Process (L3) | L4 | Sub-Process/ Activity (L4) | Technology/ AAES Process | Technology/ AAES Subprocess | Map to Process level |
| 2 | Value Chain | 2.2 | Source and Prepare Raw Materials | 2.2.3 | Prepare Raw Materials | 2.2.3.5 | Monitor Materials Performance | 2.2.3.5.3 | Provide and discuss process performance analysis with procurement, materials management and operations | | | |
| 2 | Value Chain | 2.2 | Source and Prepare Raw Materials | 2.2.3 | Prepare Raw Materials | 2.2.3.6 | Perform Process and Material Research and Improvement | 2.2.3.6.1 | Provide data to Labs and external research/quality entities | | | |
| 2 | Value Chain | 2.2 | Source and Prepare Raw Materials | 2.2.3 | Prepare Raw Materials | 2.2.3.6 | Perform Process and Material Research and Improvement | 2.2.3.6.2 | Establish pilots with new materials, additives and reductants | | | |
| 2 | Value Chain | 2.2 | Source and Prepare Raw Materials | 2.2.3 | Prepare Raw Materials | 2.2.3.6 | Perform Process and Material Research and Improvement | 2.2.3.6.3 | Provide feedback to suppliers | | | |

Fig. 28D

| | | PROCESS | | | | | | | Technology | | |
|---|---|---|---|---|---|---|---|---|---|---|---|
| L0 | Platform (L0) | Capability Area (L1) | L1 | L2 | Capability (L2) | L3 | Process (L3) | L4 | Sub-Process/ Activity (L4) | Technology/ AAES Process | Technology/ AAES Subprocess | Map to Process level |
| 2 | Value Chain | Source and Prepare Raw Materials | 2.2 | 2.2.3 | Prepare Raw Materials | 2.2.3.6 | Perform Process and Material Research and Improvement | 2.2.3.6.4 | Develop improvement plans for main processes/raw materials | | | |
| 2 | Value Chain | Manage Production - Primary Operations | 2.3 | 2.3.1 | Manage Operations | 2.3.1.1 | Optimize Input Burden (Short Term) | 2.3.1.1.1 | Confirm Required Characteristics of Produced Product | | | |
| 2 | Value Chain | Manage Production - Primary Operations | 2.3 | 2.3.1 | Manage Operations | 2.3.1.1 | Optimize Input Burden (Short Term) | 2.3.1.1.2 | Evaluate the degree of Availability of Materials | | | |
| 2 | Value Chain | Manage Production - Primary Operations | 2.3 | 2.3.1 | Manage Operations | 2.3.1.1 | Optimize Input Burden (Short Term) | 2.3.1.1.3 | Identify Feasible Burden Options | | | |
| 2 | Value Chain | Manage Production - Primary Operations | 2.3 | 2.3.1 | Manage Operations | 2.3.1.1 | Optimize Input Burden (Short Term) | 2.3.1.1.4 | Optimize Quality / Cost Tradeoff | | | |
| 2 | Value Chain | Manage Production - Primary Operations | 2.3 | 2.3.1 | Manage Operations | 2.3.1.2 | Run and Record Production | 2.3.1.2.1 | Dispatch Production Activities | Manufacturing Execution | MTS, MTO Rep/Disc mf | L3 |
| 2 | Value Chain | Manage Production - Primary Operations | 2.3 | 2.3.1 | Manage Operations | 2.3.1.2 | Run and Record Production | 2.3.1.2.2 | Execute Activities | | | |

Fig. 28E

| | | PROCESS | | | | | | Technology | | |
|---|---|---|---|---|---|---|---|---|---|---|
| L0 | Platform (L0) | L1 | Capability Area (L1) | L2 | Capability (L2) | L3 | Process (L3) | L4 | Sub-Process/ Activity (L4) | Technology/ AAES Process | Technology/ AAES Subprocess | Map to Process level |

| L0 | Platform (L0) | L1 | Capability Area (L1) | L2 | Capability (L2) | L3 | Process (L3) | L4 | Sub-Process/ Activity (L4) | Technology/ AAES Process | Technology/ AAES Subprocess | Map to Process level |
|---|---|---|---|---|---|---|---|---|---|---|---|---|
| 2 | Value Chain | 2.3 | Manage Production-Primary Operations | 2.3.1 | Manage Operations | 2.3.1.2 | Run and Record Production | 2.3.1.2.3 | Monitor Production Activities | Manufacturing Execution | Confirmation & Goods movements | L3 |
| 2 | Value Chain | 2.3 | Manage Production-Primary Operations | 2.3.1 | Manage Operations | 2.3.1.2 | Run and Record Production | 2.3.1.2.4 | Record & Report Production Results | Manufacturing Execution | Batch production | L3 |
| 2 | Value Chain | 2.3 | Manage Production-Primary Operations | 2.3.1 | Manage Operations | 2.3.1.3 | Manage Process Excellence | 2.3.1.3.1 | Define Performance Measurements | | | |
| 2 | Value Chain | 2.3 | Manage Production-Primary Operations | 2.3.1 | Manage Operations | 2.3.1.3 | Manage Process Excellence | 2.3.1.3.2 | Perform Data Collection and Analysis | | | |
| 2 | Value Chain | 2.3 | Manage Production-Primary Operations | 2.3.1 | Manage Operations | 2.3.1.3 | Manage Process Excellence | 2.3.1.3.3 | Manage Continuous Improvement Program Application | | | |
| 2 | Value Chain | 2.3 | Manage Production-Primary Operations | 2.3.1 | Manage Operations | 2.3.1.4 | Perform Supervision | 2.3.1.4.1 | Schedule and Manage Labor | | | |
| 2 | Value Chain | 2.3 | Manage Production-Primary Operations | 2.3.1 | Manage Operations | 2.3.1.4 | Perform Supervision | 2.3.1.4.2 | Manage Overheads | | | |
| 2 | Value Chain | 2.3 | Manage Production-Primary Operations | 2.3.1 | Manage Operations | 2.3.1.4 | Perform Supervision | 2.3.1.4.3 | Apply Leadership | | | |
| 2 | Value Chain | 2.3 | Manage Production-Primary Operations | 2.3.2 | Manage Product and Process Quality | 2.3.2.1 | Manage Quality of Inbound Materials and Supplies | 2.3.2.1.1 | Identify Materials which have to be Controlled. | Quality control | Integration with shop floor QC | L3 |

Fig. 28F

| | PROCESS | | | | | | | | | Technology | | |
|---|---|---|---|---|---|---|---|---|---|---|---|---|
| L0 | Platform (L0) | L1 | Capability Area (L1) | L2 | Capability (L2) | L3 | Process (L3) | L4 | Sub-Process/Activity (L4) | Technology/AAES Process | Technology/AAES Subprocess | Map to Process level |
| 2 | Value Chain | 2.3 | Manage Production - Primary Operations | 2.3.2 | Manage Product and Process Quality | 2.3.2.1 | Manage Quality of Inbound Materials and Supplies | 2.3.2.1.2 | Set Acceptance Limits | | | |
| 2 | Value Chain | 2.3 | Manage Production - Primary Operations | 2.3.2 | Manage Product and Process Quality | 2.3.2.1 | Manage Quality of Inbound Materials and Supplies | 2.3.2.1.3 | Notify Procurement of Material Requirements | | | |
| 2 | Value Chain | 2.3 | Manage Production - Primary Operations | 2.3.2 | Manage Product and Process Quality | 2.3.2.1 | Manage Quality of Inbound Materials and Supplies | 2.3.2.1.4 | Perform Testing and Sampling | Quality inspections-Procurement receipt | GR Inspection from PO | L3 |
| 2 | Value Chain | 2.3 | Manage Production - Primary Operations | 2.3.2 | Manage Product and Process Quality | 2.3.2.1 | Manage Quality of Inbound Materials and Supplies | 2.3.2.1.5 | Manage Notifications | | | |
| 2 | Value Chain | 2.3 | Manage Production - Primary Operations | 2.3.2 | Manage Product and Process Quality | 2.3.2.2 | Monitor Process | 2.3.2.2.1 | Identify Process Parameters | | | |
| 2 | Value Chain | 2.3 | Manage Production - Primary Operations | 2.3.2 | Manage Product and Process Quality | 2.3.2.2 | Monitor Process | 2.3.2.2.2 | Control Parameters | | | |
| 2 | Value Chain | 2.3 | Manage Production - Primary Operations | 2.3.2 | Manage Product and Process Quality | 2.3.2.2 | Monitor Process | 2.3.2.2.3 | Measure Parameters | | | |

Fig. 28G

| | PROCESS | | | | | | | | | Technology | | |
|---|---|---|---|---|---|---|---|---|---|---|---|---|
| L0 | Platform (L0) | L1 | Capability Area (L1) | L2 | Capability (L2) | L3 | Process (L3) | L4 | Sub-Process/ Activity (L4) | Technology/ AAES Process | Technology/ AAES Subprocess | Map to Process level |
| 2 | Value Chain | 2.3 | Manage Production-Primary Operations | 2.3.2 | Manage Product and Process Quality | 2.3.2.2 | Monitor Process | 2.3.2.2.4 | Evaluate Process Data | | | |
| 2 | Value Chain | 2.3 | Manage Production-Primary Operations | 2.3.2 | Manage Product and Process Quality | 2.3.2.7 | Manage Certifications | 2.3.2.7.1 | Test Material | | | |
| 2 | Value Chain | 2.3 | Manage Production-Primary Operations | 2.3.2 | Manage Product and Process Quality | 2.3.2.7 | Manage Certifications | 2.3.2.7.2 | Issue Certification | Quality management-Certification | Definition of customer quality requirements | L3 |
| 2 | Value Chain | 2.4 | Rolling, Forming & Finishing | 2.4.1 | Manage Operations | 2.4.1.1 | Run and Record Production | 2.4.1.1.1 | Dispatch Production Activities | Manufacturing Execution | MTS, MTO Rep/Disc mf | L3 |
| 2 | Value Chain | 2.5 | Processing & Fabrication | 2.5.1 | Manage Operations | 2.5.1.4 | Manage Outside Processing | 2.5.1.4.2 | Receive and Evaluate Requests for Service | | | |
| 2 | Value Chain | 2.5 | Processing & Fabrication | 2.5.1 | Manage Operations | 2.5.1.4 | Manage Outside Processing | 2.5.1.4.3 | Release Work Order to Process and Authorize Shipment to Processor | Manufacturing Execution | Process routes with sub-contracting operations | L3 |
| 2 | Value Chain | 2.5 | Processing & Fabrication | 2.5.1 | Manage Operations | 2.5.1.4 | Manage Outside Processing | 2.5.1.4.4 | Schedule OSP | | | |
| 2 | Value Chain | 2.5 | Processing & Fabrication | 2.5.1 | Manage Operations | 2.5.1.4 | Manage Outside Processing | 2.5.1.4.5 | Monitor OSP Production | | | |
| 2 | Value Chain | 2.5 | Processing & Fabrication | 2.5.1 | Manage Operations | 2.5.1.4 | Manage Outside Processing | 2.5.1.4.5 | Perform OSP Release Shipment | | | |

Fig. 28H

| | | | PROCESS | | | | | | Technology | | |
|---|---|---|---|---|---|---|---|---|---|---|---|
| L0 | Platform (L0) | L1 | Capability Area (L1) | L2 | Capability (L2) | L3 | Process (L3) | L4 | Sub-Process/ Activity (L4) | Technology/ AAES Process | Technology/ AAES Subprocess | Map to Process level |
| 2 | Value Chain | 2.5 | 2.5 Processing & Fabrication | 2.5.2 | Manage Product and Process Quality | 2.5.2.1 | Manage Quality of Inbound Materials and Supplies | 2.5.2.1.1 | Identify Materials which have to be Controlled | | | |
| 2 | Value Chain | 2.5 | 2.5 Processing & Fabrication | 2.5.2 | Manage Product and Process Quality | 2.5.2.1 | Manage Quality of Inbound Materials and Supplies | 2.5.2.1.2 | Set Acceptance Limits | | | |
| 2 | Value Chain | 2.5 | 2.5 Processing & Fabrication | 2.5.2 | Manage Product and Process Quality | 2.5.2.1 | Manage Quality of Inbound Materials and Supplies | 2.5.2.1.3 | Notify Procurement of Material Requirements | | | |
| 2 | Value Chain | 2.5 | 2.5 Processing & Fabrication | 2.5.2 | Manage Product and Process Quality | 2.5.2.1 | Manage Quality of Inbound Materials and Supplies | 2.5.2.1.4 | Perform Testing and Sampling | Quality inspections- Procurement receipt | GR Inspection from PO | L3 |
| 2 | Value Chain | 2.6 | Market and Sell Products | 2.6.3 | Conduct Order Management | 2.6.3.1 | Maintain Customer Information | 2.6.3.1.3 | Maintain Credit Master | Org Elements / Masters | Customer Credit Master | L4 |
| 2 | Value Chain | 2.6 | Market and Sell Products | 2.6.3 | Conduct Order Management | 2.6.3.1 | Maintain Customer Information | 2.6.3.1.4 | Maintain Contract Inform | Contract Processing | Contract Processing | L4 |
| 2 | Value Chain | 2.6 | Market and Sell Products | 2.6.3 | Conduct Order Management | 2.6.3.2 | Perform Price Administration | 2.6.3.2.1 | Apply Price to Orders | Pricing Management | Pricing Management | L3 |

| L0 | Platform (L0) | L1 | Capability Area (L1) | L2 | Capability (L2) | L3 | Process (L3) | L4 | Sub-Process/ Activity (L4) | Technology/ AAES Process | Technology/ AAES Subprocess | Map to Process level |
|---|---|---|---|---|---|---|---|---|---|---|---|---|
| | | | | | | | | | | PROCESS | | Technology |
| 2 | Value Chain | 2.6 | Market and Sell Products | 2.6.3 | Conduct Order Management | 2.6.3.2 | Perform Price Administration | 2.6.3.2.2 | Conduct Pricing Exceptions Approval Process | | | |
| 2 | Value Chain | 2.6 | Market and Sell Products | 2.6.3 | Conduct Order Management | 2.6.3.2 | Perform Price Administration | 2.6.3.2.3 | Manage and Update Prices | | | |
| 2 | Value Chain | 2.6 | Market and Sell Products | 2.6.3 | Conduct Order Management | 2.6.3.2 | Perform Price Administration | 2.6.3.2.4 | Monitor Compliance to Guidelines | | | |
| 2 | Value Chain | 2.6 | Market and Sell Products | 2.6.3 | Conduct Order Management | 2.6.3.4 | Manage Customer Inquiries and Quotes | 2.6.3.4.9 | Save Quotation and Send to Customer | Pre-Sales Processing | Quotation Processing | L4 |
| 2 | Value Chain | 2.6 | Market and Sell Products | 2.6.3 | Conduct Order Management | 2.6.3.5 | Create and Monitor Sales Orders | 2.6.3.5.1 | Create Sales Order | Sales Order Processing | Sales Order Processing | L3 |
| | | | | | | | | | | | Rush Sales | |
| 2 | Value Chain | 2.6 | Market and Sell Products | 2.6.3 | Conduct Order Management | 2.6.3.5 | Create and Monitor Sales Orders | 2.6.3.5.2 | Confirm Product Availability | | | |
| 2 | Value Chain | 2.6 | Market and Sell Products | 2.6.3 | Conduct Order Management | 2.6.3.5 | Create and Monitor Sales Orders | 2.6.3.5.3 | Check Credit | Sales Order Processing | Credit Management | L4 |
| 2 | Value Chain | 2.6 | Market and Sell Products | 2.6.3 | Conduct Order Management | 2.6.3.5 | Create and Monitor Sales Orders | 2.6.3.5.4 | Assign Routing and Promise Date | | | |

| PROCESS | | | | | | | | | | Technology | | |
|---|---|---|---|---|---|---|---|---|---|---|---|---|
| L0 | Platform (L0) | L1 | Capability Area (L1) | L2 | Capability (L2) | L3 | Process (L3) | L4 | Sub-Process/ Activity (L4) | Technology/ AAES Process | Technology/ AAES Subprocess | Map to Process level |
| 2 | Value Chain | 2.6 | Market and Sell Products | 2.6.3 | Conduct Order Management | 2.6.3.5 | Create and Monitor Sales Orders | 2.6.3.5.5 | Confirm Sales Order | | | |
| 2 | Value Chain | 2.6 | Market and Sell Products | 2.6.3 | Conduct Order Management | 2.6.3.5 | Create and Monitor Sales Orders | 2.6.3.5.6 | Release Sales Order | | | |
| 2 | Value Chain | 2.6 | Market and Sell Products | 2.6.3 | Conduct Order Management | 2.6.3.5 | Create and Monitor Sales Orders | 2.6.3.5.7 | Track Sales Order | | | |
| 2 | Value Chain | 2.6 | Market and Sell Products | 2.6.3 | Conduct Order Management | 2.6.3.6 | Create Customer Invoice | 2.6.3.6.1 | Prepare Invoice | | | |
| 2 | Value Chain | 2.6 | Market and Sell Products | 2.6.3 | Conduct Order Management | 2.6.3.6 | Create Customer Invoice | 2.6.3.6.2 | Issue and Dispatch Invoice Copies [Paper/Electronic] | Billing | Billing (Delivery, Order related) | L4 |
| 2 | Value Chain | 2.6 | Market and Sell Products | 2.6.3 | Conduct Order Management | 2.6.3.7 | Manage Customer Claims | 2.6.3.7.1 | Receive and Enter Customer Claims | | | |
| 2 | Value Chain | 2.6 | Market and Sell Products | 2.6.3 | Conduct Order Management | 2.6.3.7 | Manage Customer Claims | 2.6.3.7.2 | Investigate Claims | Customer Complaints & Returns Processing | Returns processing | L3 |
| 2 | Value Chain | 2.6 | Market and Sell Products | 2.6.3 | Conduct Order Management | 2.6.3.7 | Manage Customer Claims | 2.6.3.7.3 | Determine Claim Disposition | | | |
| 2 | Value Chain | 2.6 | Market and Sell Products | 2.6.3 | Conduct Order Management | 2.6.3.7 | Manage Customer Claims | 2.6.3.7.4 | Process Claim Adjustment | | | |

Fig. 28K

| | PROCESS | | | | | | | | | | Technology | | |
|---|---|---|---|---|---|---|---|---|---|---|---|---|---|
| L0 | Platform (L0) | L1 | Capability Area (L1) | L2 | Capability (L2) | L3 | Process (L3) | L4 | Sub-Process/ Activity (L4) | | Technology/ AAES Process | Technology/ AAES Subprocess | Map to Process level |
| 2 | Value Chain | 2.6 | Market and Sell Products | 2.6.3 | Conduct Order Management | 2.6.3.7 | Manage Customer Claims | 2.6.3.7.5 | Inform Customer and Close Claims | | | | |
| 2 | Value Chain | 2.6 | Market and Sell Products | 2.6.3 | Conduct Order Management | 2.6.3.8 | Provide Order Status | 2.6.3.8.1 | Receive Question | | | | |
| 2 | Value Chain | 2.6 | Market and Sell Products | 2.6.3 | Conduct Order Management | 2.6.3.8 | Provide Order Status | 2.6.3.8.2 | Consolidate Inventory, Production and Schedule Information | | | | |
| 2 | Value Chain | 2.6 | Market and Sell Products | 2.6.3 | Conduct Order Management | 2.6.3.8 | Provide Order Status | 2.6.3.8.3 | Update Promise | | | | |
| 2 | Value Chain | 2.6 | Market and Sell Products | 2.6.3 | Conduct Order Management | 2.6.3.8 | Provide Order Status | 2.6.3.8.4 | Respond to Questions | | | | |
| 2 | Value Chain | 2.6 | Market and Sell Products | 2.6.3 | Conduct Order Management | 2.6.3.9 | Expedite Production Orders | 2.6.3.9.1 | Receive Request/ Proactive Initiate for Improvement on Item | | | | |
| 2 | Value Chain | 2.6 | Market and Sell Products | 2.6.3 | Conduct Order Management | 2.6.3.9 | Expedite Production Orders | 2.6.3.9.2 | Evaluate Options to Improve Performance | | | | |
| 2 | Value Chain | 2.6 | Market and Sell Products | 2.6.3 | Conduct Order Management | 2.6.3.9 | Expedite Production Orders | 2.6.3.9.3 | Advise Priorities to Prepare Detailed Schedule/ Manage and Execute Transportation | | | | |
| 2 | Value Chain | 2.6 | Market and Sell Products | 2.6.3 | Conduct Order Management | 2.6.3.9 | Expedite Production Orders | 2.6.3.9.4 | Advise Customer of Actions | | | | |

Fig. 28L

| | PROCESS | | | | | | | | | | Technology | | |
|---|---|---|---|---|---|---|---|---|---|---|---|---|---|
| L0 | Platform (L0) | L1 | Capability Area (L1) | L2 | Capability (L2) | L3 | Process (L3) | L4 | Sub-Process/ Activity (L4) | | Technology/ AAES Process | Technology/ AAES Subprocess | Map to Process level |
| 2 | Value Chain | 2.6 | Market and Sell Products | 2.6.4 | Manage Customer Relationships | 2.6.4.1 | Manage Sales Channels | 2.6.4.1.1 | Establish Contracts with Selected Distributors and Agents | | | | |
| 2 | Value Chain | 2.6 | Market and Sell Products | 2.6.4 | Manage Customer Relationships | 2.6.4.1 | Manage Sales Channels | 2.6.4.1.2 | Prepare Agent and Distributor Business Plan | | | | |
| 2 | Value Chain | 2.6 | Market and Sell Products | 2.6.4 | Manage Customer Relationships | 2.6.4.1 | Manage Sales Channels | 2.6.4.1.3 | Assess and Review Agent and Distributor Performance | | | | |
| 2 | Value Chain | 2.6 | Market and Sell Products | 2.6.4 | Manage Customer Relationships | 2.6.4.2 | Manage Sales Prospects | 2.6.4.2.1 | Identify and Qualify Leads | | | | |
| 2 | Value Chain | 2.6 | Market and Sell Products | 2.6.4 | Manage Customer Relationships | 2.6.4.2 | Manage Sales Prospects | 2.6.4.2.2 | Track New Business Success Rate | | | | |
| 2 | Value Chain | 2.6 | Market and Sell Products | 2.6.4 | Manage Customer Relationships | 2.6.4.3 | Manage Sales Force | 2.6.4.3.1 | Communicate Pricing Guidelines and Monitor Compliance | | | | |
| 2 | Value Chain | 2.6 | Market and Sell Products | 2.6.4 | Manage Customer Relationships | 2.6.4.3 | Manage Sales Force | 2.6.4.3.2 | Design Incentive Approach | | | | |
| 2 | Value Chain | 2.6 | Market and Sell Products | 2.6.4 | Manage Customer Relationships | 2.6.4.3 | Manage Sales Force | 2.6.4.3.3 | Develop Forecasts | | | | |

Fig. 28M ration.
SYSTEM FOR LINKING PROCESS ARCHITECTURES TO TECHNOLOGY ARCHITECTURES

CROSS REFERENCE TO RELATED APPLICATION

This application claims the benefit of U.S. Provisional Application No. 61/326,065, filed Apr. 20, 2010, the entirety of which is incorporated by reference herewith.

BACKGROUND

1. Technical Field

This disclosure relates generally to linking process architecture to technology architecture. More specifically, this disclosure relates to transforming complex business processes into technology components.

2. Related Art

Businesses continue to face demands to sell new products and services and transport those products and services in a timely, cost effective, and efficient manner to customers. In a global market, it is not unusual for a business to quickly expand to new geographic locations while providing new products and services. Expanding to new markets and providing new products and services require changing the business processes. Meanwhile, the complexity of the underlying technologies providing the services continues to increase.

To stay competitive, businesses quickly adapt their technological systems to their changing business processes. However, mapping the underlying information technology to changing business processes may be time consuming. Moreover, the cost associated with developing and integrating new systems with changing business needs can be excessive and therefore impractical. Furthermore, even once the new technology is implemented, tedious configurations may be necessary every time a minor change is needed. Given the time and expenditure required, by the time the new technology is in place and the business processes are fully implemented in the technology, either the processes change or the technology needs to be upgraded.

SUMMARY

By way of introduction, systems and methods are described, for mapping process architectures to technology architectures. A system for mapping a process architecture to technology architecture allows complex business processes to be mapped to preconfigured technical solutions that require minimal customization. The system helps simplify and minimize the analysis, design, build, test, and deploy steps of the traditional approach.

In a first aspect, a method for mapping a process architecture to a technology architecture is disclosed. Generally, a platform selection, a capability area selection, and technology process selection are received by the processor. The processor then identifies the associated data and transforms the data associated with the platform selection and the data associated with the capability area selection with the data associated with the technology process selection.

In a second aspect, a system for mapping a process architecture to a technology architecture is disclosed. Generally, the system includes computer program code that that receives a platform selection, a capability area selection, and a technology process selection. Computer program code also identifies the associated data and transforms the data associated with the platform selection and the data associated with the capability area selection with the data associated with the technology process selection.

In a third aspect, a system for mapping a process architecture to a technology architecture is disclosed. Generally, the system includes a platform selection module, a capability selection module, a technology process module, and a mapping module.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The architecture may be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIGS. 28A-M illustrate a sample of a worksheet used to map a business process to a technology process.

DETAILED DESCRIPTION

Reference will now be made to the accompanying drawings, which form a part hereof, and which show, by way of illustration, specific exemplary embodiments. The principles described herein may, however, be embodied in many different forms, and this specification should not be construed to limit the claims. Rather, these embodiments are provided so that the disclosure will be thorough and complete to those skilled in the art.

Figure 1:
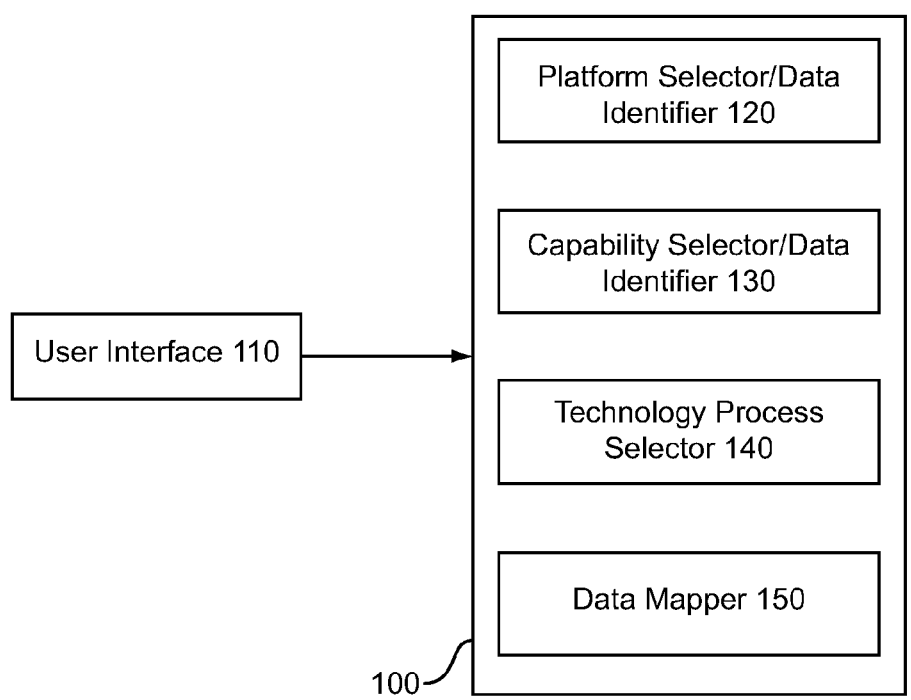
FIG. 1 is a block diagram of a system architecture for linking process architectures to technology architectures.

FIG. 1 illustrates modules of the system architecture 100. The modules include a user interface 110, a platform selector/data identifier 120, a capability selector/data identifier 130, and a data mapper 150.

The user interface 110 may be a secured web page that requires a user id and password to ensure that access is only available to legitimate users of the system. Alternatively, the user interface 110 may be client side software installed on a local computing device such as a desktop or a laptop in a client server network. The user interface 110 provides a user friendly medium so that business users and other non technical experts can use the system and manipulate the configurations necessary for their business processes without having advanced technical knowledge in the underlying technologies.

The platform selector/data identifier 120 module includes software code that is configured to receive a platform selection initiated by a user using the user interface 110. Additionally, the platform selector/data identifier 120 module includes software code that is configured to identify data associated with the platform. The capability selector/data identifier 130 module includes software code that is configured to receive a capability initiated by a user using the user interface 110. Additionally, the capability selector/data identifier 130 module includes software code that is configured to identify data associated with the capability. The technology process selector 140 module includes software code that is configured to receive a technology process initiated by a user using the user interface 110. The data mapper 150 includes software code that is configured to identify the data associated with the technology process 140 and map the data associated with the platform selection and the data associated with the capability area selection with the data associated with the technology process selection.

Figure 2:
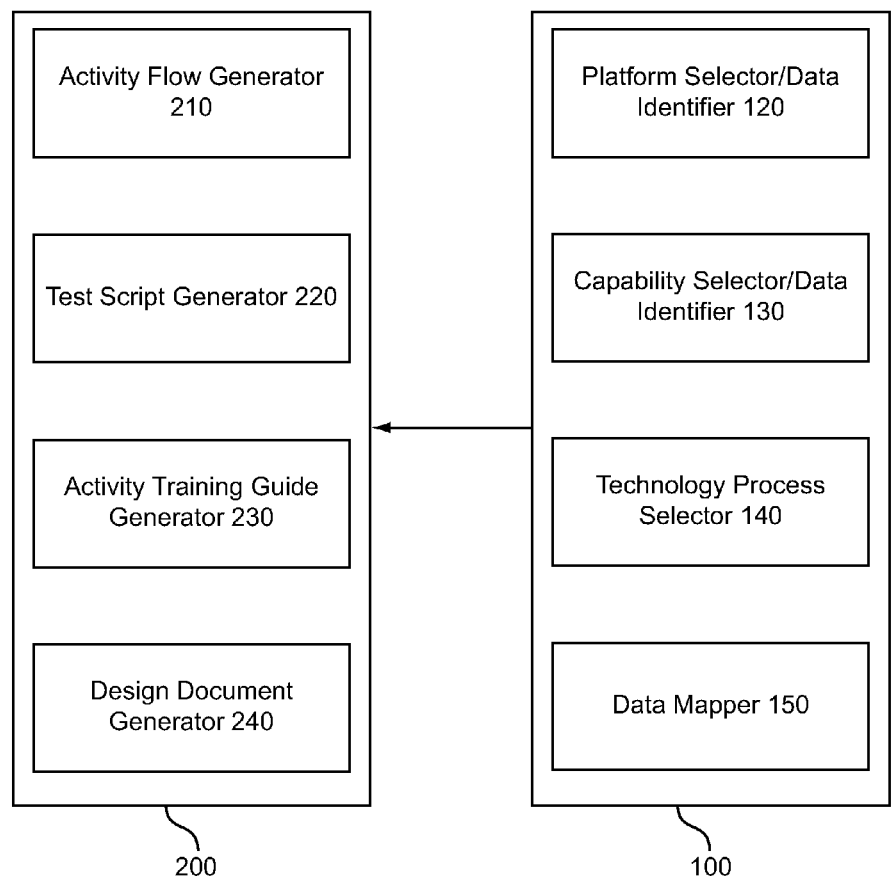
FIG. 2 is a block diagram of modules of a portion of the system architecture.

FIG. 2 is a view of the modules of a portion of the system architecture 100. Generator 200 includes activity flow generator 210, test script generator 220, activity training guide generator 230 and a design document generator 240. The activity flow generator 210 includes software program code that is configured to analyze data received from system 100 and generate activity flow diagrams based on the received data. The test script generator 220 includes software program code that is configured to analyze data received from system 100 and generate test scripts based on the received data. The activity training guide generator 230 includes software program code that is configured to analyze data received from system 100 and generate activity training guides based on the received data. The design document generator 240 includes software program code that is configured to analyze data received from system 100 and generate activity training guides based on the received data.

Figure 3:
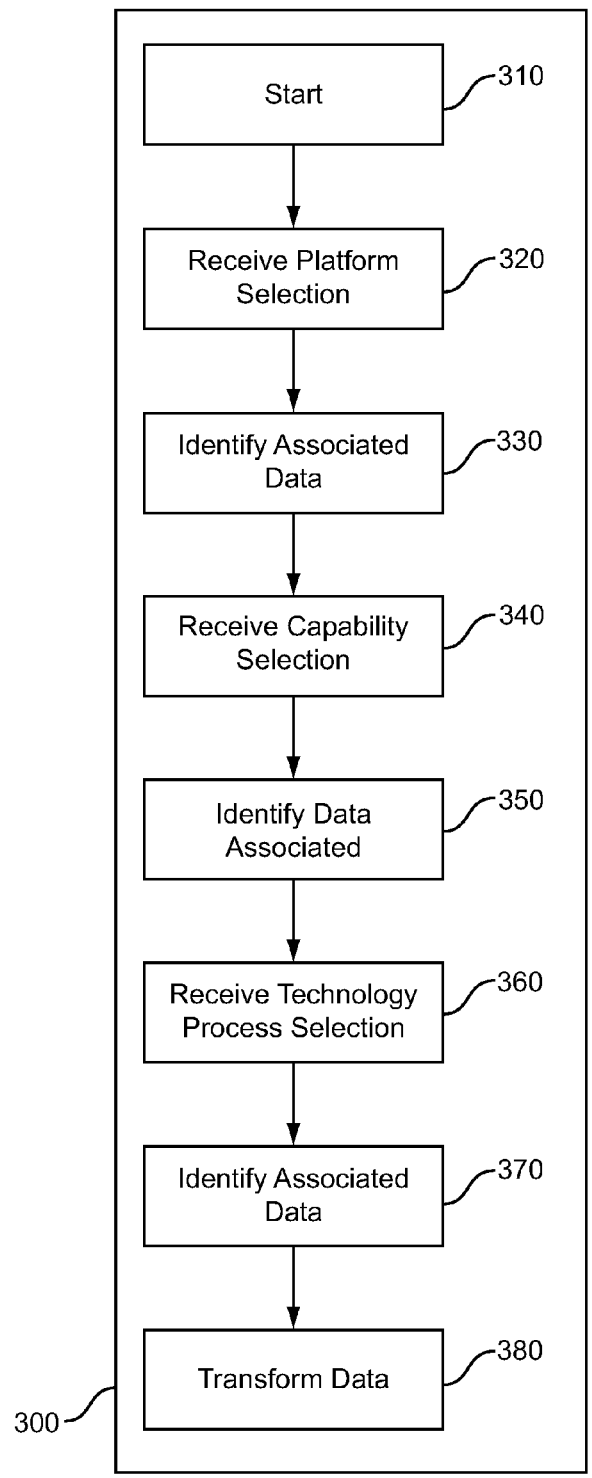
FIG. 3 is a flow chart of a process of mapping process architecture to technology architecture in an exemplary system.

FIG. 3 is a flow diagram illustrating the process flow 300 that the system architecture 100 can perform. Operation begins at block 310. At block 320, a platform selection is received by a processor. Next, at block 330, the data associated with the platform selection is identified by the processor. At block 340, the processor receives a capability area selection. Next, at block 350, the processor identifies the data associated with the capability area selection. At block 360, a technology process selection is received by the processor. Next, at block 370, the processor identifies data associated with the technology process selection. Finally, at block 380, the processor transforms the data by mapping the data associated with the platform selection 320 and the data associated with the capability area selection 130 with the data associated with the technology process selection 370.

Figure 4:
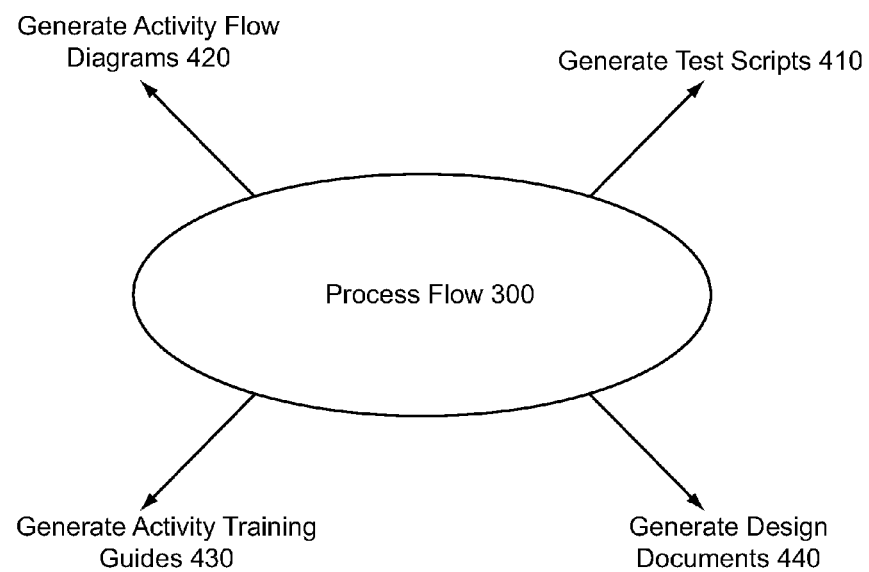
FIG. 4 is a flow diagram of functions available within the architecture.

FIG. 4 illustrates some of the additional functions available within process flow 300. Examples of the functions available are generating test scripts 410, generating activity flow diagrams 420, generating activity training guides 430, and generating design documents 440. At 410, the processor can generate test scripts based on the mapping of the data associated with platform selection 320 and the data associated with the capability area selection 330 with the data associated with the technology process election 370. At 320, the processor can generate activity flow diagrams based on the mapping of the data associated with platform selection 320 and the data associated with the capability area selection 330 with the data associated with the technology process election 370. At 430, the processor can generate activity training guides based on the mapping of the data associated with platform selection 320 and the data associated with the capability area selection 330 with the data associated with the technology process election 370. At 440, the processor can generate design documents based on the mapping of the data associated with platform selection 320 and the data associated with the capability area selection 330 with the data associated with the technology process election 370.

Figure 5:
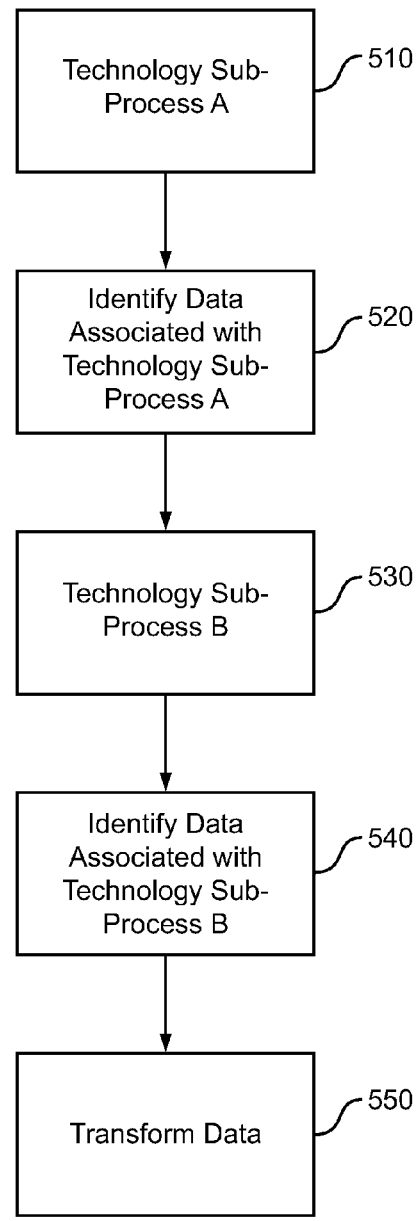
FIG. 5 is a flow chart of a portion of the process architecture to technology architecture in an exemplary system.

FIG. 5 illustrates a portion of the process architecture to a technology architecture. The exemplary process flow 300 can be configured to receive and process data for a plurality of technology sub-processes. At block 510, the processor receives a first technology sub-process selection. Technology sub-process A. At block 520, the processor identifies data associated with the technology sub-process A. Next, at block 530, the processor receives a second technology sub-process selection. Technology sub-process B. At block 540, the processor identifies data associated with the technology sub-process B. Finally, at block 550, the processor transforms the data by mapping the data associated with the platform selection 320 and the data associated with the capability area selection 330 and the data associated with the technology process selection 370 with the data associated with technology sub-process A and the data associated with technology sub-process B.

Figure 6:
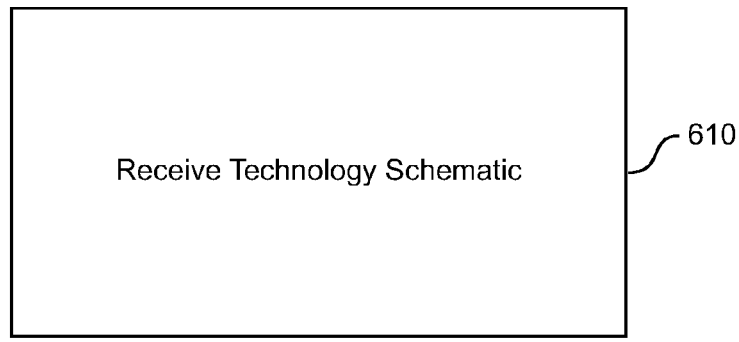
FIG. 6 is a flow chart of a process of a portion of the exemplary system architecture.

FIG. 6 illustrates the process of a portion of the exemplary process flow 300. At block 610, the processor receives a technology schematic, which illustrates how the same process can be implemented by the technology of choice, from the user device.

Figure 7:
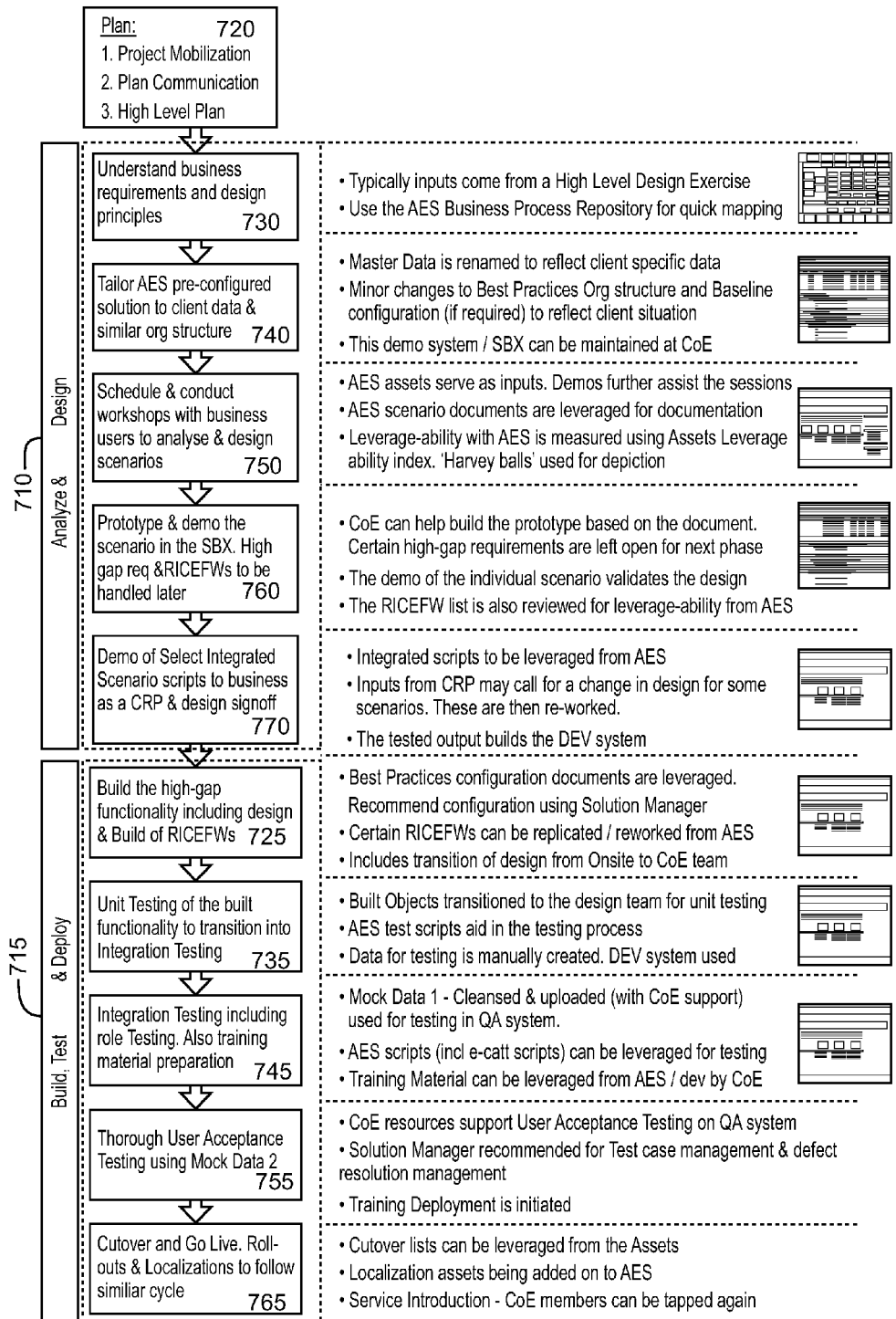
FIG. 7 is a high level process view of the new implementation.

FIG. 7 illustrates a high level process view of the system for linking process architectures to technology architectures. The implementation may be divided into two main phases; analyze and design phase 710 and the build, test, and deploy phase 715. In the past, the design phase of a project may be time consuming as each new project would need a full design phase. With the new system for linking process architectures to technology architectures, a large portion of the design phase is already complete so only minor configurations need to be made to tailor to the client specific needs.

The analyze and design phase 710 begins with a plan 720. The plan 720 forms the basics of a project including project mobilization, communicating the plan, and determining a high level plan of a project. At step 730, the business requirements and design principles are understood. Inputs may come from a high level design exercise. A business process repository may be used for quick mapping. At step 740, a preconfigured solution is tailored to the client specific data. A master data set may be renamed to reflect the data specific to the client. Minor tweaks may be made to the organizational structure. If required, baseline configuration may be made to reflect client specific details. At step 750, workshops may be conducted with the business users to analyze and design specific scenarios. At step 760, scenarios may be prototyped and demonstrated. Next, at step 770, selected integrated scenario scripts may be demonstrated to the business users. Here, additional scenarios may be implemented and re-worked.

The build, test, and deploy 715 phase of the new implementation begins at step 725 by building the high-gap functionality. To build the high-gap functionality, best practices configuration documents may be leveraged. At step 735, unit testing begins to test the built in functionality prior to transitioning to the integration testing phase. Next, at step 745, integration testing begins. Integration testing 745 includes role testing and training material preparation. Available scripts and training material can be leveraged with minor configuration changes which minimize the time required. At step 755, mock data can be used for user acceptance testing. Finally, at step 765, the system will be live. Rollouts and localizations can follow a similar suit.

Figure 28A:
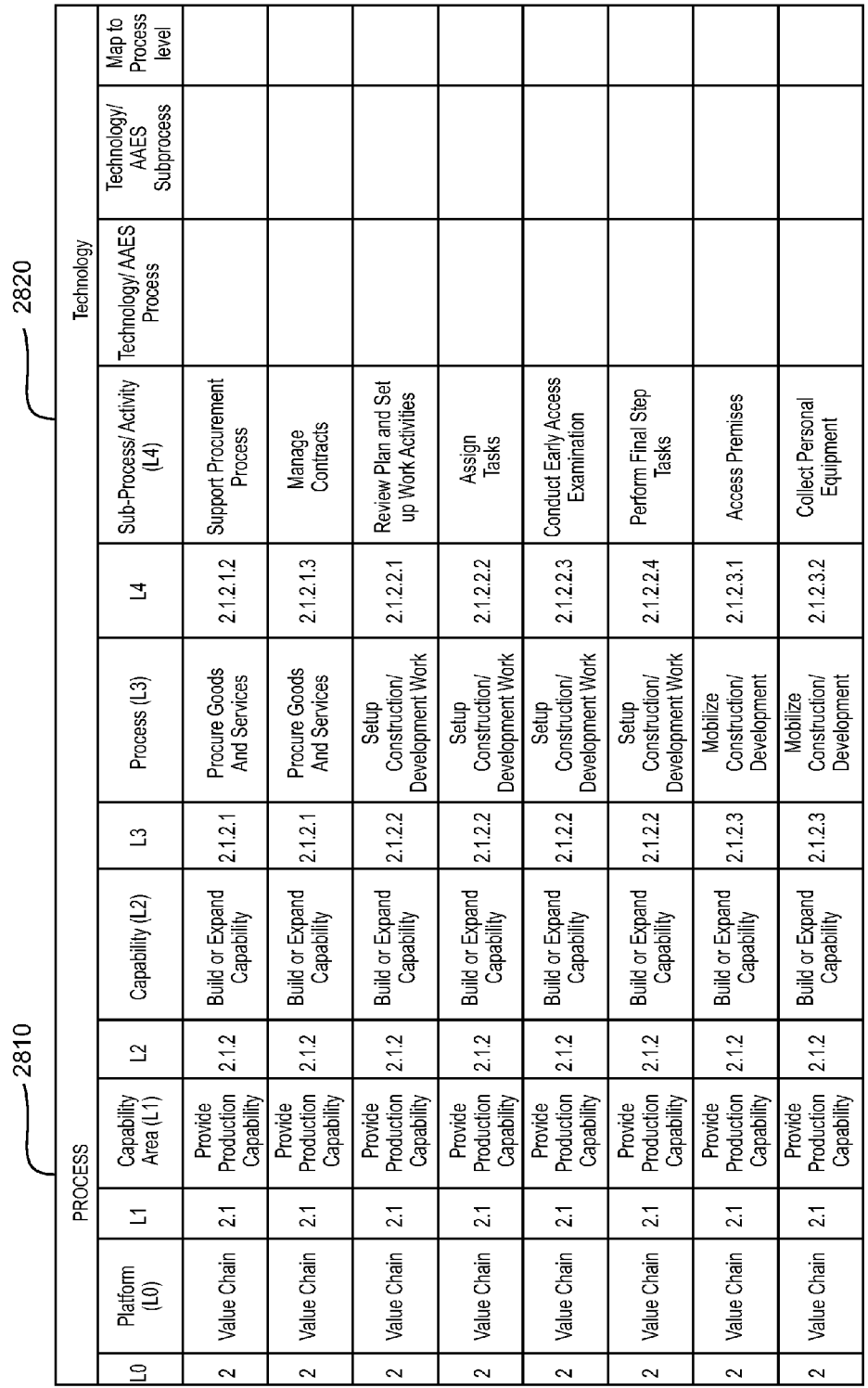

FIG. 28 (represented by 28A-28M) illustrates a sample of a worksheet used to map a business process to a technology process. The worksheet is broken into two sets of columns, those related to the processes 2810 and those related to the technology 2820. The mapping begins with the platform selection process (LO). The mapping of each process corresponds to a numerical value for simplification. In this example, the platform selection: value chain corresponds to LO: 2. The capability area column corresponds to the L1 column. For example, the capability area "provide production capability" corresponds to 2.1. The capability area "source and prepare raw materials" corresponds to 2.2, the capability area "manage production-primary operations" corresponds to 2.3 and so forth. The capability column corresponds to the L2 column. For example, capability "build or expand capability" corresponds with 2.1.2, "conduct raw material sourcing" corresponds to 2.2.2, capability "prepare raw materials" corresponds with 2.2.3 and so forth. The process column corresponds with the L3 column. For example, the process "check consumption history and inventory procedures" corresponds with 2.2.2.2, the process "analyze sourcing options" corresponds with 2.2.2.3, and so forth. The sub-process/activity column corresponds with the L4 column. For example, the sub-process/activity "support procurement process" corresponds with 2.1.2.1.2, the sub-process/activity "manage contracts" corresponds with 2.1.2.1.3, and so forth.

The last 3 columns relate to the technology piece. While a variety of technologies may be used, one technology used is AAES SAP, manufactured by SAP America, Inc. The Technology/Process column includes the relevant technology process that maps to the business process. For example, on FIG. 28D, the technology/process "procurement planning" maps to the process "conduct procurement." The technology/sub process column maps to the sub-process/activity "define procurement targets by item (quantities, target price, quality, and timeline)." Finally, the map to process level maps the technology to the process level in a simplified manner. For example, with the same example in FIG. 28D, the map to process level is L2.

Figure 8:
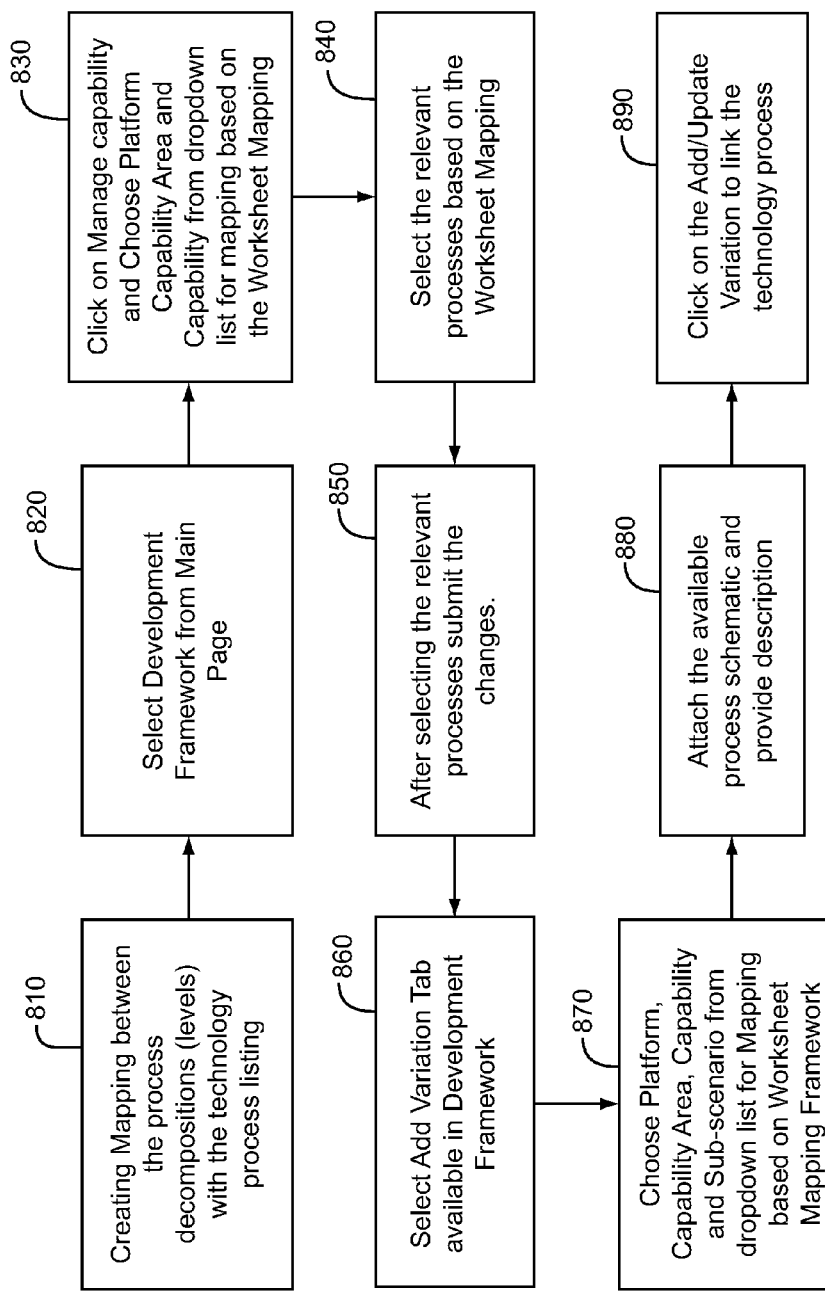
FIG. 8 is a flow diagram of a detailed view of the mapping process.

FIG. 8 illustrates a detailed view of the mapping process highlighting the user experience. The process begins at step 810 where a mapping is created between the process decomposition or levels with the technology process listing. Any capable technology platform may be used such as SAP Solutions Manager manufactured by SAP America, Inc., or Oracle manufactured by Oracle Corporation. At step 820, on the main page of the user interface, a user selects "development framework." At step 830, the user selects "manage capability" and chooses the platform capability area and capability from the dropdown list for mapping based on the worksheet mapping (see, for example, FIG. 28). At step 840, the user selects the relevant processes based on the worksheet Mapping. Any software platform can be used. One example is SAP manufactured by SAP America, Inc. After selecting the relevant processes, the user submits the changes at step 850. Next, at step 860, the user may select the "add variation tab." Next, at step 870, the user may choose a platform capability area, a capability, and sub-scenario from the dropdown list for mapping based on the worksheet mapping framework. At step 880, the user may attach the available process schematic and provide a description for each schematic attached. Finally, at step 890, the user clicks on the add/update variation to link the technology process to the business process.

Figure 9:
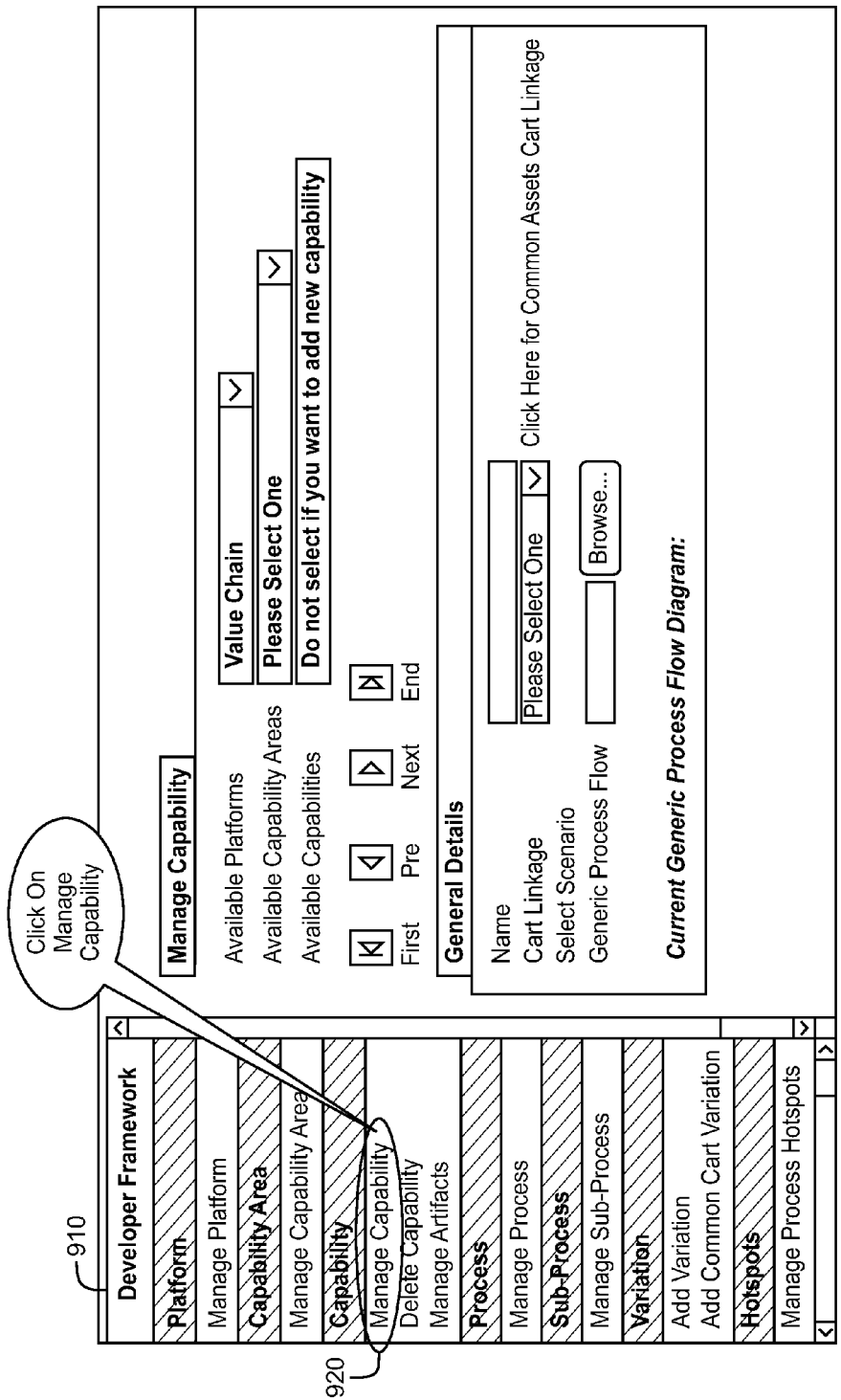
FIG. 9 is a screen shot of an exemplary user interface that highlights a portion of the mapping process.

FIGS. 9-15 represent screen shots that outline the details of the process flow in FIG. 8. FIG. 9 provides a screen shot of an exemplary user interface that highlights a portion of the mapping process. On the left side of the screen, a user may select from the list of developer framework 910. In this example, the user chooses manage capability 920.

Figure 10:
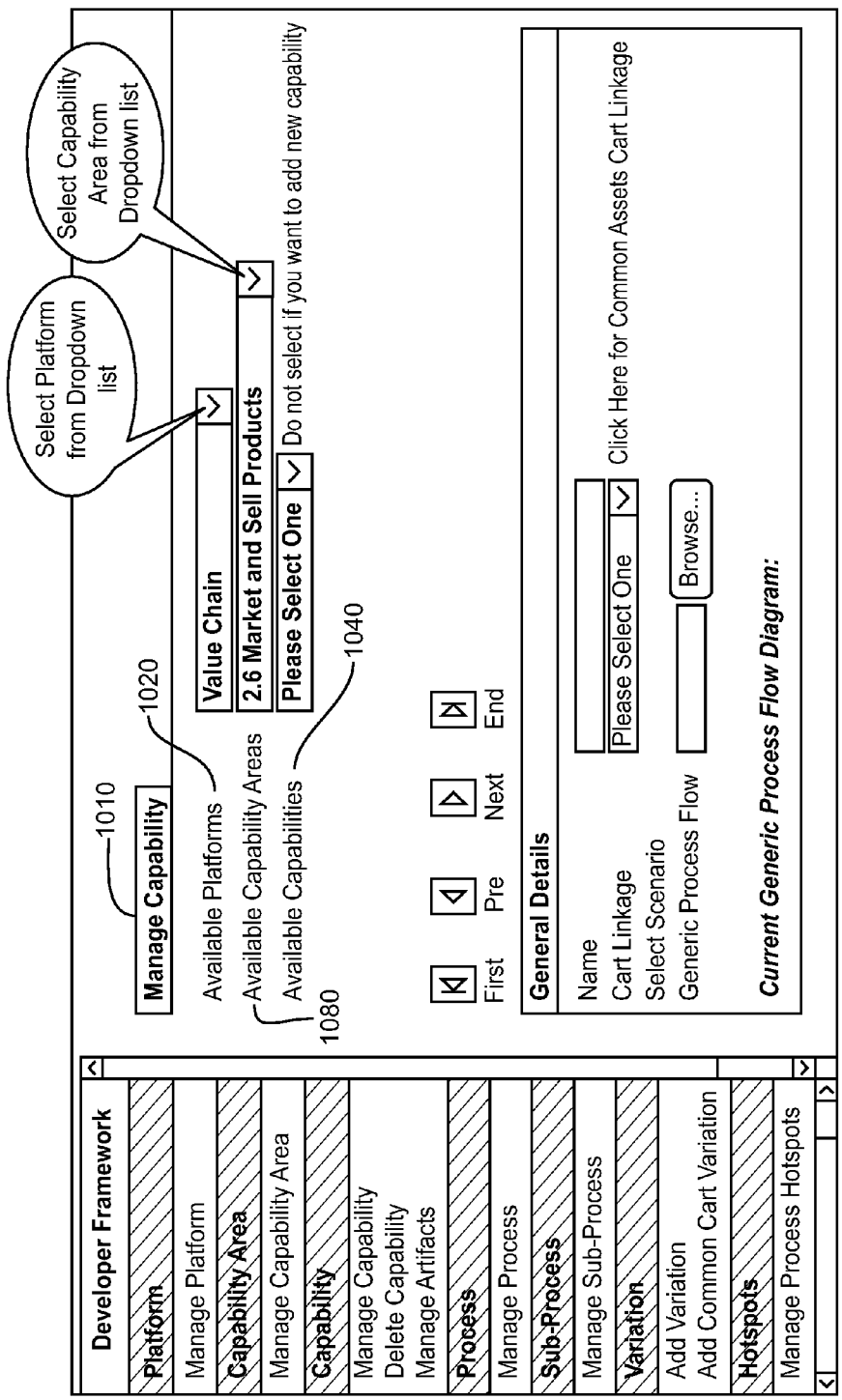
FIG. 10 is a screen shot of the user interface that highlights a portion of the mapping process.

FIG. 10 is a screen shot of the "manage capability" tab 1010 of the exemplary user interface. The user chooses a platform from the list of available platforms 1020. In this example, the user has chosen value chain. Next, the user chooses a capability area from the available capability areas 1030. In this example, 2.6 market and sell products was chosen. Next, the user may choose from the list of available capabilities 1040. Available capabilities may include conduct order management, manage customer relations, and manage customer (capabilities not shown in FIG. 10).

Figure 11:
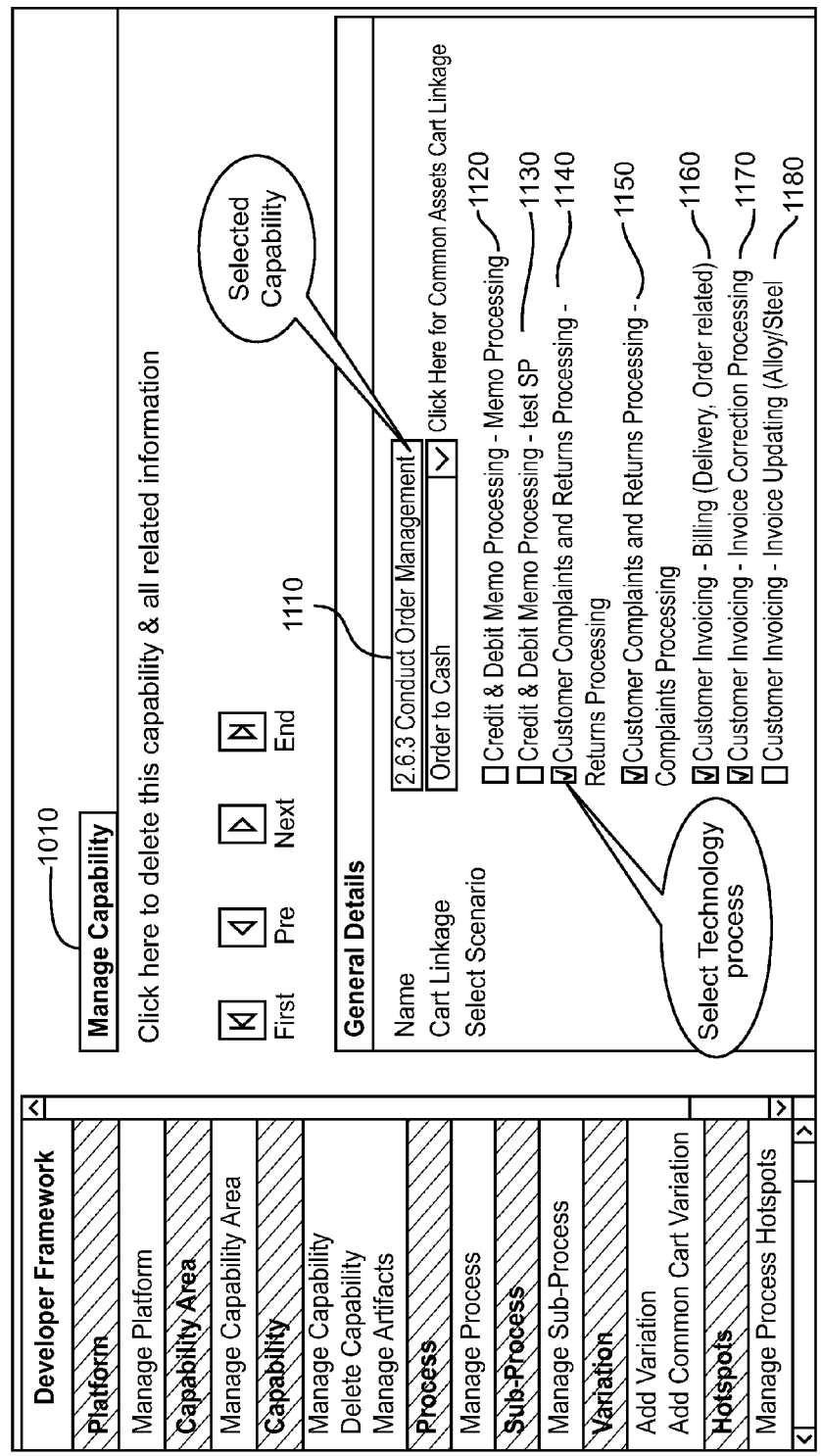
FIG. 11 is a screen shot of the user interface that highlights a portion of the mapping process.

FIG. 11 is a screen shot of the "manage capability" tab 1010 with a detailed view of the available capabilities. In this example, the available capability 1110 selected is 2.6.3 conduct order management. Next, the user may choose a technology process from the list available. For this example, the list includes credit and debit memo processing-memo processing 1120, credit and debit memo processing-test SP 1130, customer complaints and returns processing-returns processing 1140, customer complaints and returns processing-complaints processing 1150, customer invoicing-billing (delivery, order related) 1160, customer invoicing-invoice correction processing 1170, customer invoicing-invoice updating (alloy/steel sub process) 1180. For this example, the user has selected four technology processes: customer complaints and returns processing-returns processing 1140, customer complaints and returns processing-complaints processing 1150, customer invoicing-billing (delivery, order related) 1160, and customer invoicing-invoice correction processing 1170.

Figure 12:
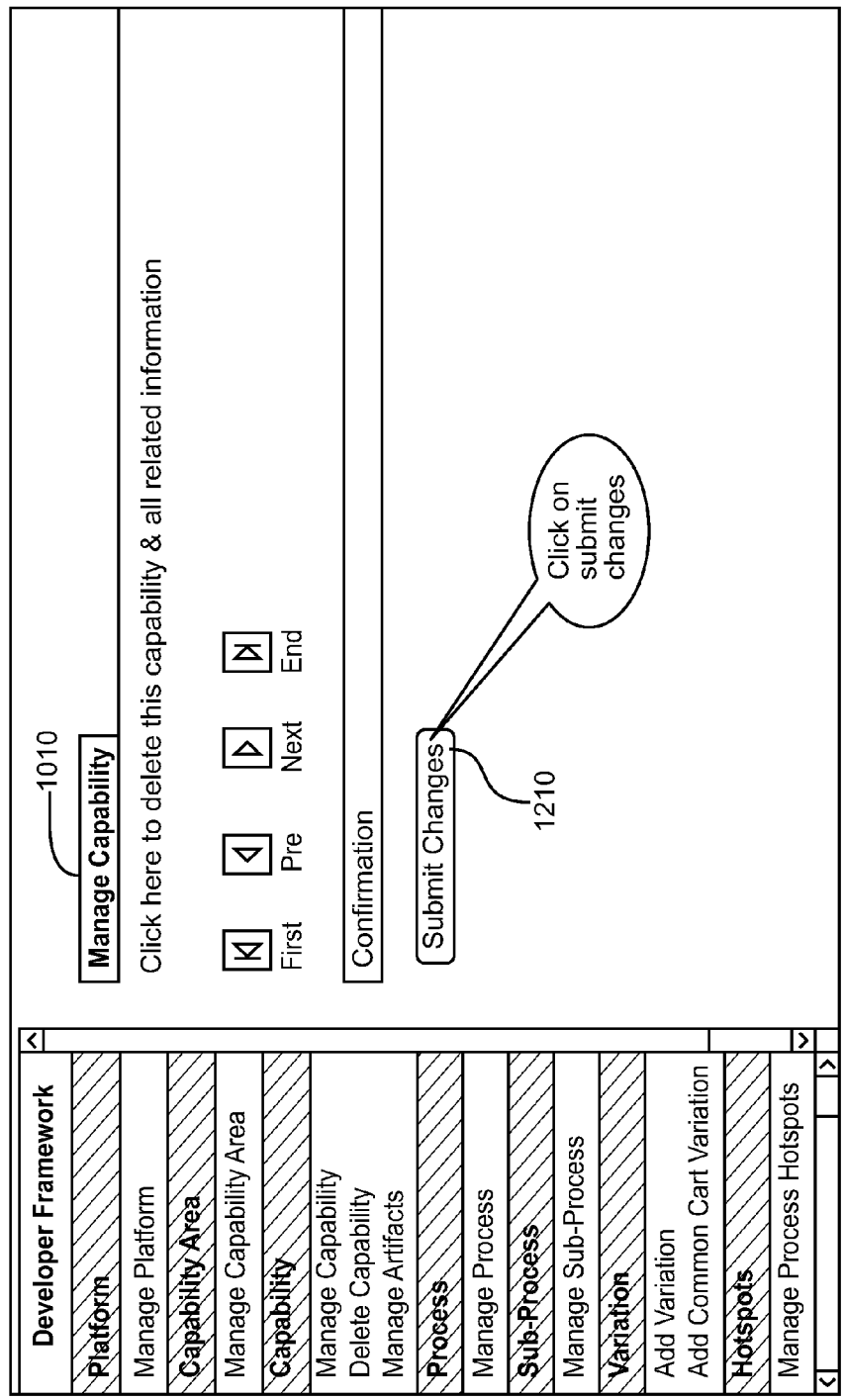
FIG. 12 is a screen shot of the final step in the initial mapping process.

FIG. 12 is a screen shot of the "manage capability" 1010 tab that shows how changes are saved. Once the user has chosen an available platform, an available capability area, available capabilities, and technology sub process(es), the user clicks on submit changes 1210 to ensure that all changes have been made and saved.

Figure 13:
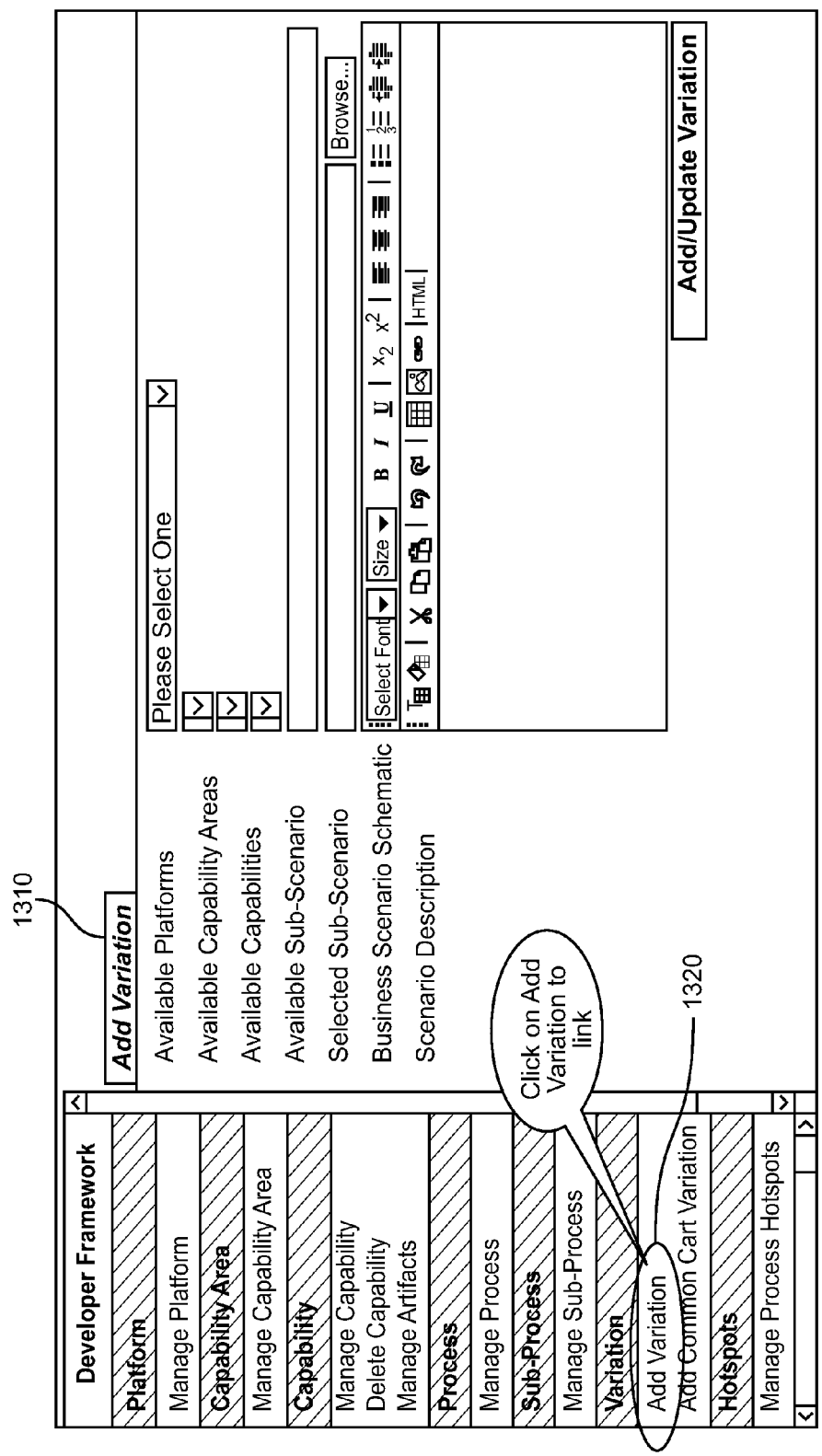
FIG. 13 is a screen shot of the variation function.

FIG. 13 is a generic screen shot of the "add variation" 1310 tab of the exemplary user interface. One the manage capability related tasks are completed, the user may add variations. The first step is to click on the add variation link 1320 from the developer framework listing.

Figure 14:
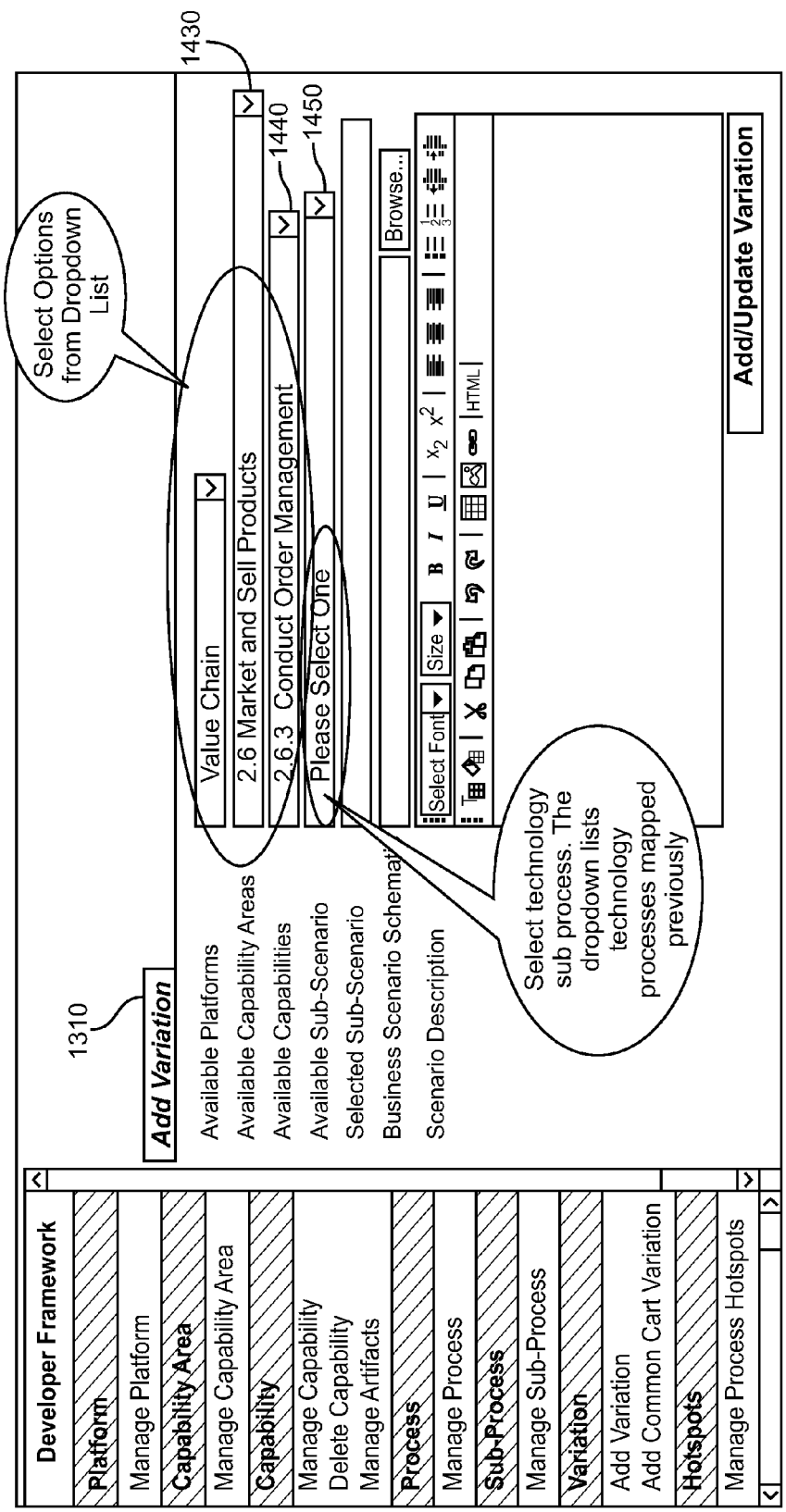
FIG. 14 is a more detailed screen shot of the variation function.

FIG. 14 is a more detailed screen shot of the "add variation" tab 1310 of the exemplary user interface. Previously selected options are highlighted. In this example, the available platform selected is value chain 1420, The available capability area is 2.6 market and sell products 1430, and the available capability selected is 2.6.3 conduct order management 1440. Now, the user selects a technology sub-process 1450. The list available automatically refreshes to the technology processes mapped previously (see FIG. 11).

Figure 15:
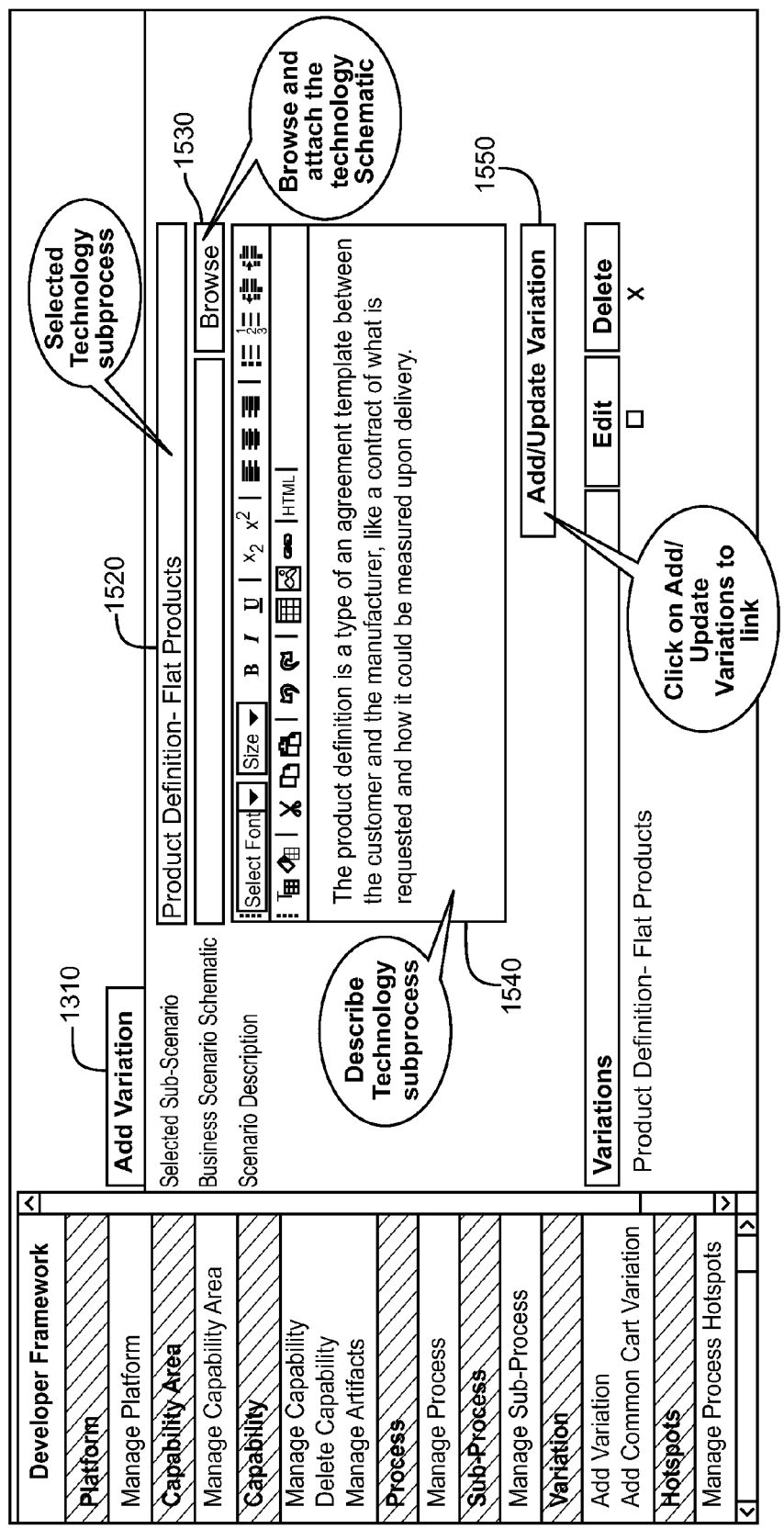
FIG. 15 is a detailed screen shot of a technology sub-process example.

FIG. 15 is screen shot of the "add variation" tab 1310 with the technology sub process options shown in detail. In this scenario, the user has chosen product definition-flat products for the technology sub process. Next, the user may browse and attach 1530 the technology schematic. Next the user may describe the technology sub process 1540. Finally, the user clicks on the add/update variation link 1550.

Figure 16:
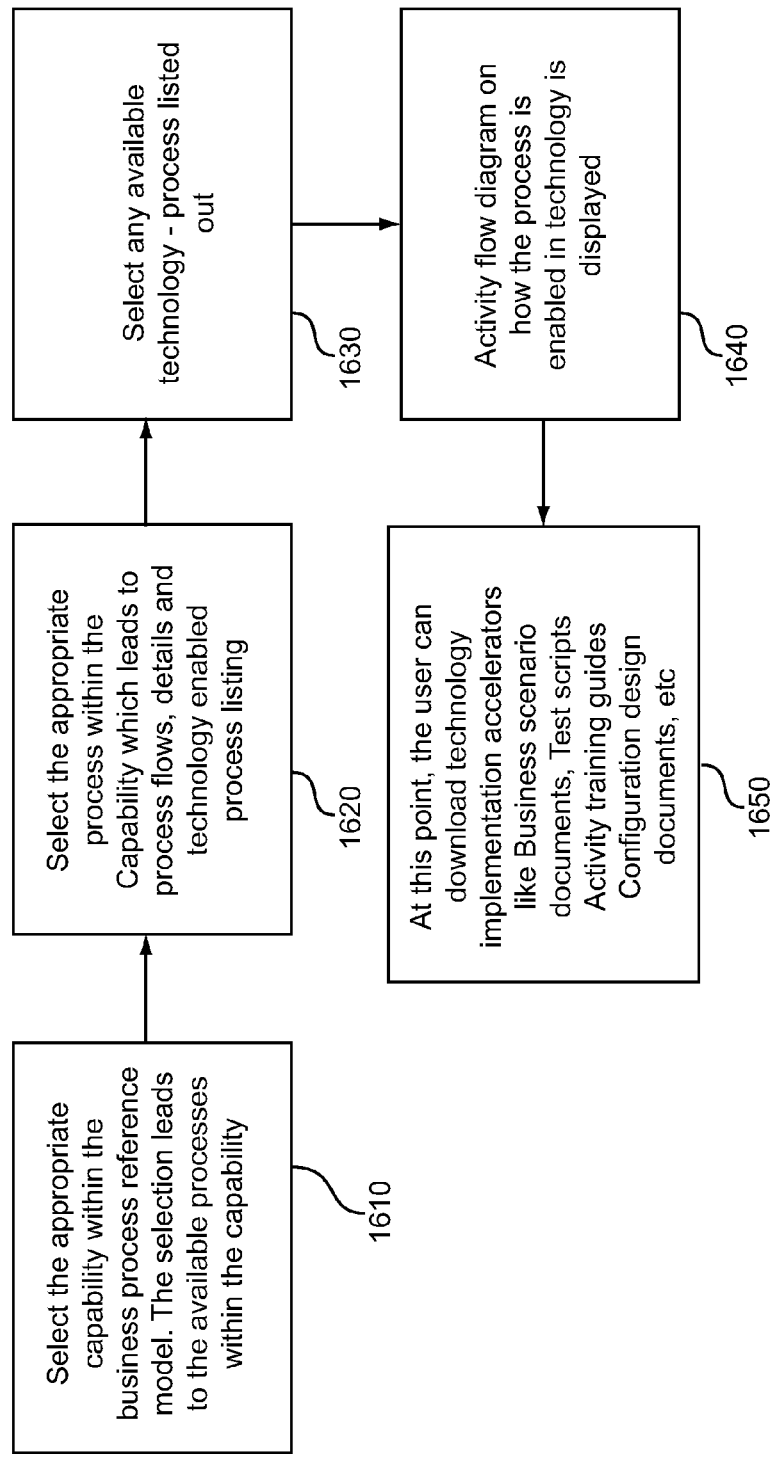
FIG. 16 is a process flow of an example of the process flow.

FIG. 16 illustrates an example of a process flow. The process begins at block 1610 where an appropriate capability is selected. The appropriate capability is taken from a business process reference model. Once this is selected, a group of available processes within that capability will be available. Next, at block 1620, the user selects the appropriate process within the capability. This selection leads to process flows, details and a technology enabled process listing. At block 1630, the user selects an available technology. One technology is SAP Solutions Manager manufactured by SAP America, Inc. Next, at block 1630, the user selects one of the available technologies listed. At block 1640, an activity flow diagram on how the process is enabled in technology is displayed. Finally, at block 1650, the user may download technology implementation accelerators such as Business scenario documents, test scripts, activity training guides and configuration design documents.

Figure 17:
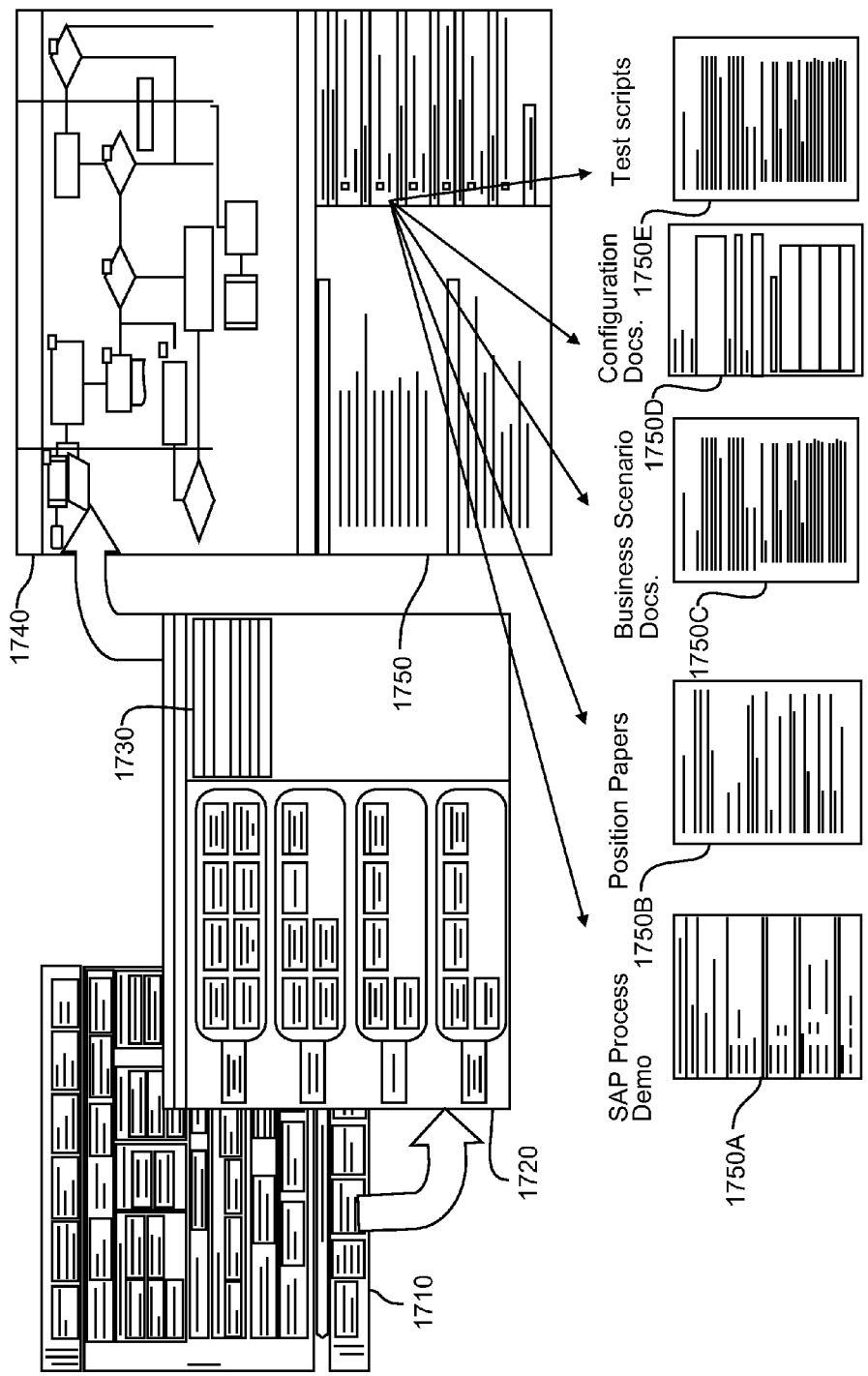
FIG. 17 is a high level view of the technology components.

FIG. 17 is a high level view of the technology components. A user may drill down the technology path and get technology specific product-oriented processes, practices, and deliverables that are linked with the leading practice business processes. The interface between an industry specific model and technology offerings 1710 displays possible scenarios and requirements on one screen. The interface between an industry specific model and technology offerings 1710 is linked to the process flow where detailed descriptions of the inputs and outputs can be displayed. Technology specific process flow and documentation 1730 and 1740 may also be accessed. In this example, the two technologies displayed are SAP and Oracle. A user may select the specific technology, such as SAP and view the technology specific process listing. The user may also view the technology specific process flow 1740. A user may also view product oriented processes, practices, and deliverables linked with leading practice business processes 1750. From here, process demonstrations 1750A, position papers 1750B, business scenario documents. 1750C, configuration documents 1750D, and test scripts 1750E may be downloaded.

FIGS. 18-22 demonstrate an example of a sales order implementation. This example links industry-leading processes to a preconfigured enterprise resource planning solution built on current technology, and is packaged with complete process documentation and industrialized implementation accelerators. Implementation accelerators include process model and technical object libraries that include ready to use reports, interfaces, conversions, extensions and forms, as well as process documentation, position papers, training materials, work plans and approach related documentation. In this example, we will view how one process, sales order processing, is decomposed from a strategic view to detailed process steps and an enterprise resource planning system configuration.

Figure 18:
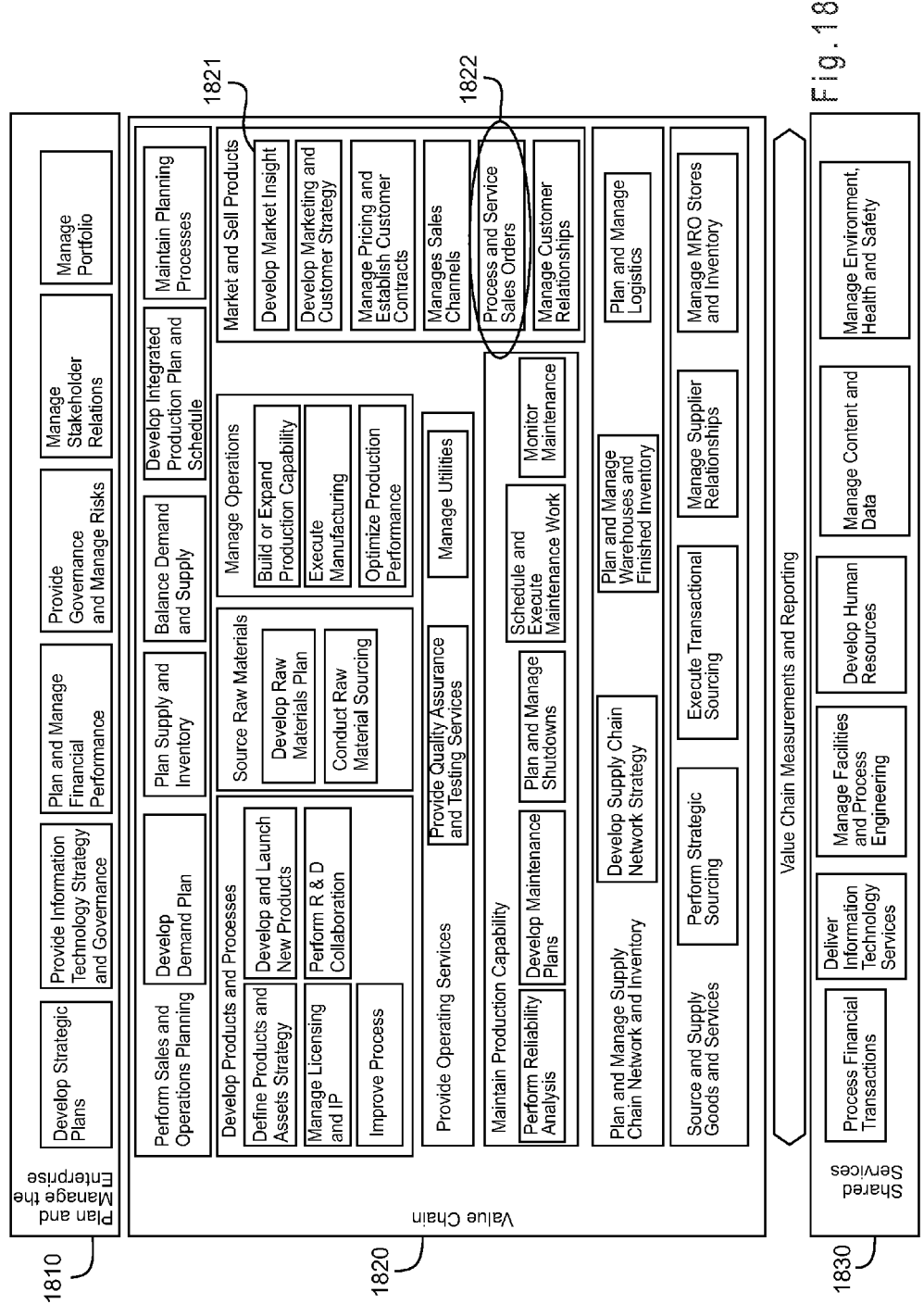
FIG. 18 is a high level screen shot of a sales order processing example.

The first step begins with FIG. 18. This model represents a chemical industry process overview for bulk and specialty chemical companies. The model offers a high-level snapshot of the key processes that enable high performance. The model is divided into three primary platforms: plan and manage the enterprise 1810, value chain 1820, and shared services 1830. The plan and manage the enterprise platform displays requirements for this phase such as developing strategic plans and providing governance and managing risks. The value chain 1820 platform is divided into a number of capability areas such as managing operations and marketing and selling products. Each of these capability areas includes a listing of capabilities. In this example, the process and service sales orders 1822 capability is selected from the market and sell products 1821 capability area.

Figure 19:
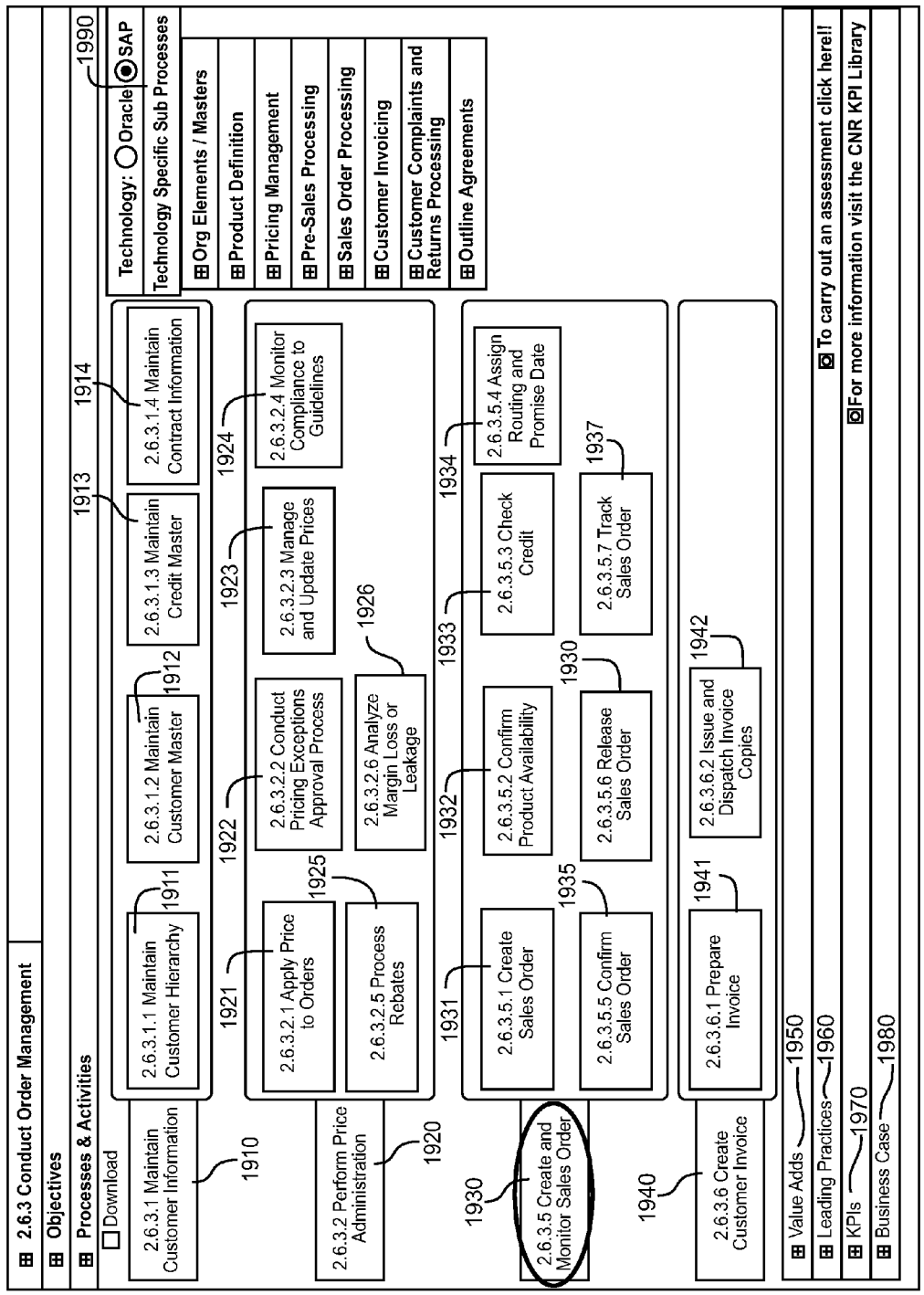
FIG. 19 is a screen shot of the processes of a sales order processing example.

FIG. 19 provides a screen shot of the processes of a sales order processing example. In this step, a user may view an overview of the sales order processes. The user can then select any of the processes to drill down further into the model. In this example, sales orders processes include: Maintain Customer Information 1910, perform price administration 1920, create and monitor sales orders 1930 and create customer invoice 1940.

Each sales order process may include several sub processes. Maintain customer information 1910 consists of maintaining customer hierarchy 1911, maintaining customer master 1912, maintaining credit master 1913, and maintaining contract information 1914. Perform price administration 1920 includes apply price to orders 1921, Conduct pricing exceptions approval process 1922, manage and update prices 1923, monitor compliance to guidelines 1924, process rebates 1925 and analyze margin loss or leakage 1926. The create and maintain sales orders 1930 process includes create sales order 1931, confirm product availability 1932, check credit 1933, assign routing and promise date 1934, confirm sales order 1935, release sales order 1936, and track sales order 1937. The create customer invoice 1940 process includes prepare invoice 1941 and issue and dispatch invoice copies 1942.

The user may also download leading practices 1960, key performance indicators (KPI's) 1970, business case 1980, and other value-adds 1950 related to sales order processing. To view how technology enables each of these processes, a user may drill down through the technology specific sub processes 1990. While a variety of technologies may be used, the two examples shown here are SAP and Oracle. In this example, SAP is selected and therefore, the sub processes listed are related to SAP technology. The sales order process selected for this example is create and monitor sales order 1930.

Figure 20:
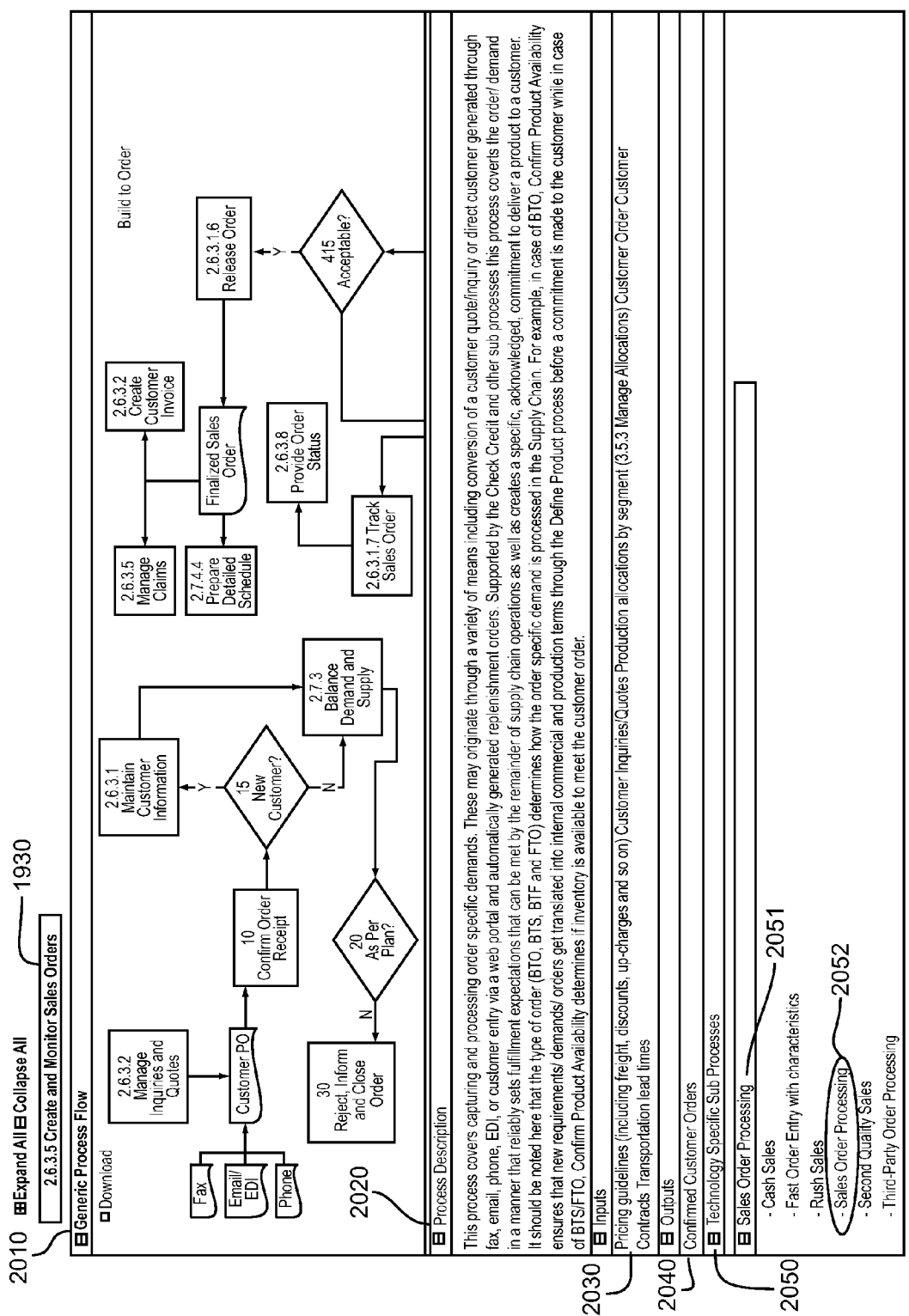
FIG. 20 is a screen shot of the process level view in the sales order processing example.

FIG. 20 provides a screen shot of the process level view in the sales order processing example. Details of the process create and monitor sales orders 1930 are displayed. Here, the user has access to many tools such as process flow diagrams 2010, inputs 2030, and outputs 2040.

A Process Description 2020 may also be displayed. For the create and monitor sales orders 1930 example, the process example may read a detailed description of the process as such as: "This process covers capturing and processing order specific demands. These may originate through a variety of means including a conversion of a customer quote/inquiry, directly generated by the customer through fax, email, phone, EDI, or a customer entry via web portal and automatically generated replenishment orders. Supported by other sub processes, this process converts the order/demand in a manner that reliably sets fulfillment expectations that can be met by the remainder of supply chain operations as well as creates a specific acknowledge commitment to deliver a product to a customer.

It should be noted that the type of order, e.g., made to order (MTO), made to stock (MTS), made to forecast (MTF), and finish to order (FTO), may determine how the order specific demand is processed in the supply chain. For example, for MTO, finished products may be pegged to a specific order received from the customer. Inventory once produced is pegged with a specific sales order/production order. Product may be customized based on customer specifications. For MTF, production may be based on forecasted demand for a specific material. MTF is often used in instances when a provider is sole sourced on a material. The buyer essentially outsources the management of the supply chain to the provider. The provider manages the pipe line of product through their production system considering production lead times, inventory and anticipated consumption by the end customer. Sales forces may manage production order generation based on a combination of internal inventories, customer inventories, and customer consumption. Inventory once produced is pegged with a specific sales order/production order. MTF may be based on a blanket purchase order from customer or material number. The MTF may require a sales force to understand customers to high degree. The receipt of customer orders do not represent a new demand but a conversion of a forecast.

With MTS, production orders may be produced with an internal sales order and without a specific customer. Quantities to be produced may be based on a forecast of end consumption. MTS is often used when there is high degree of standardization of the specification of the material being produced, e.g., there exists a set of defined characteristics of the end product which customers can order to. Upstream units may not be aware of particular customer designations. Inventory may be utilized as a resource used to satisfy multiple customer orders and allocation of the inventory may occur in order to maximize order delivery reliability. On occasion MTS may soft peg inventory to anticipated orders from customers. Customer order status may be more difficult since specific batch inventory is not tracked, but rather resource availability is tracked, e.g., inventory and time available to process.

For FTO, materials may be produced up to an intermediate inventory stage based on a forecast. Once an order from a customer is received, the order is finished to the specifications. Upstream units of build to point are blind to particular customer designations. Inventory can be staged at units in order to serve critical customers or to shorten lead times. Inventory may be soft pegged to customer orders or it can be used to satisfy orders from multiple customers and allocation of the inventory occurs in order to maximize order delivery reliability. Customer order status may be more difficult since specific pieces of inventory are not tracked, but rather resource availability is tracked, e.g., inventory and time available to process.

Examples of inputs may include pricing guidelines (including freight and discounts) and customer inquiries. An example of an output 2040 may be confirmed customer orders. The next step is to select the technology specific sub process 2050 and then select sales order processing 2051 and then sales order processing 2052 in order to view the technology enablement components.

Figure 21:
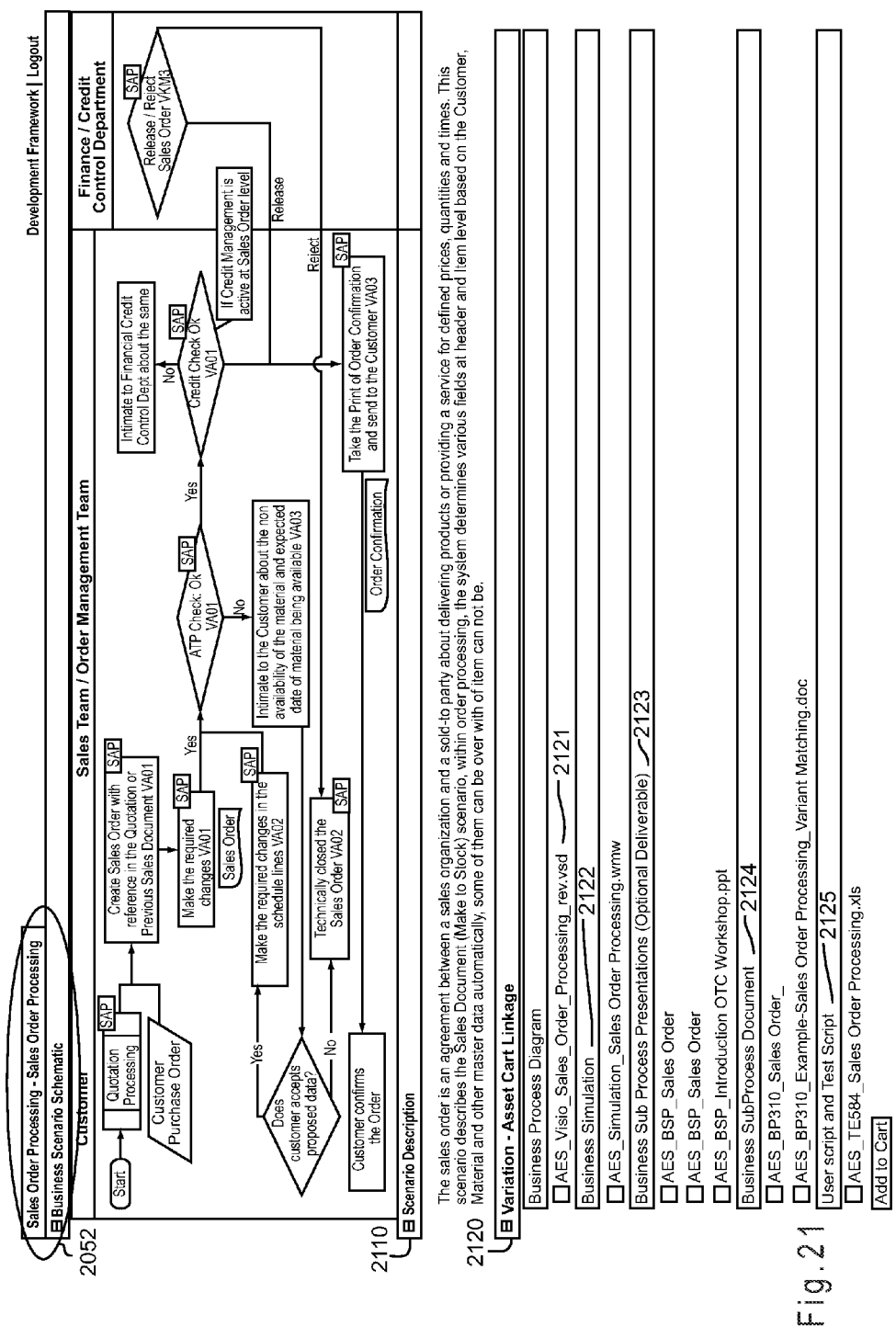
FIG. 21 is a screen shot of the technology view in the sales order processing example.

FIG. 21 provides a screen shot of the technology view in the sales order processing example. The sales order processing-sales order processing 2052 is displayed in detail. Here, the user can view the technology specific sales order processing example. These details include assets such as business scenario documents, day-in-the-life scripts, and scenario/archetype presentations, simulations, and position papers.

The scenario description 2110 describes the selected scenario in detail. For this example, the scenario description 2110 reads: "The sales order is an agreement between a sales organization and a sold to party about delivering products or providing a service for defined prices, quantities, and times. The scenario describes the sales document (Make to Stock) scenario within order processing. Variation-asset cart linkage 2120 lists the assets available. In this example, the assets available are business process diagram 2121, business simulation 2122, business sub process presentation (Optional Deliverable) 2123, business sub process document 2124, and user script and test script 2125. Each asset 2110 may include one or more documents.

Figure 22:
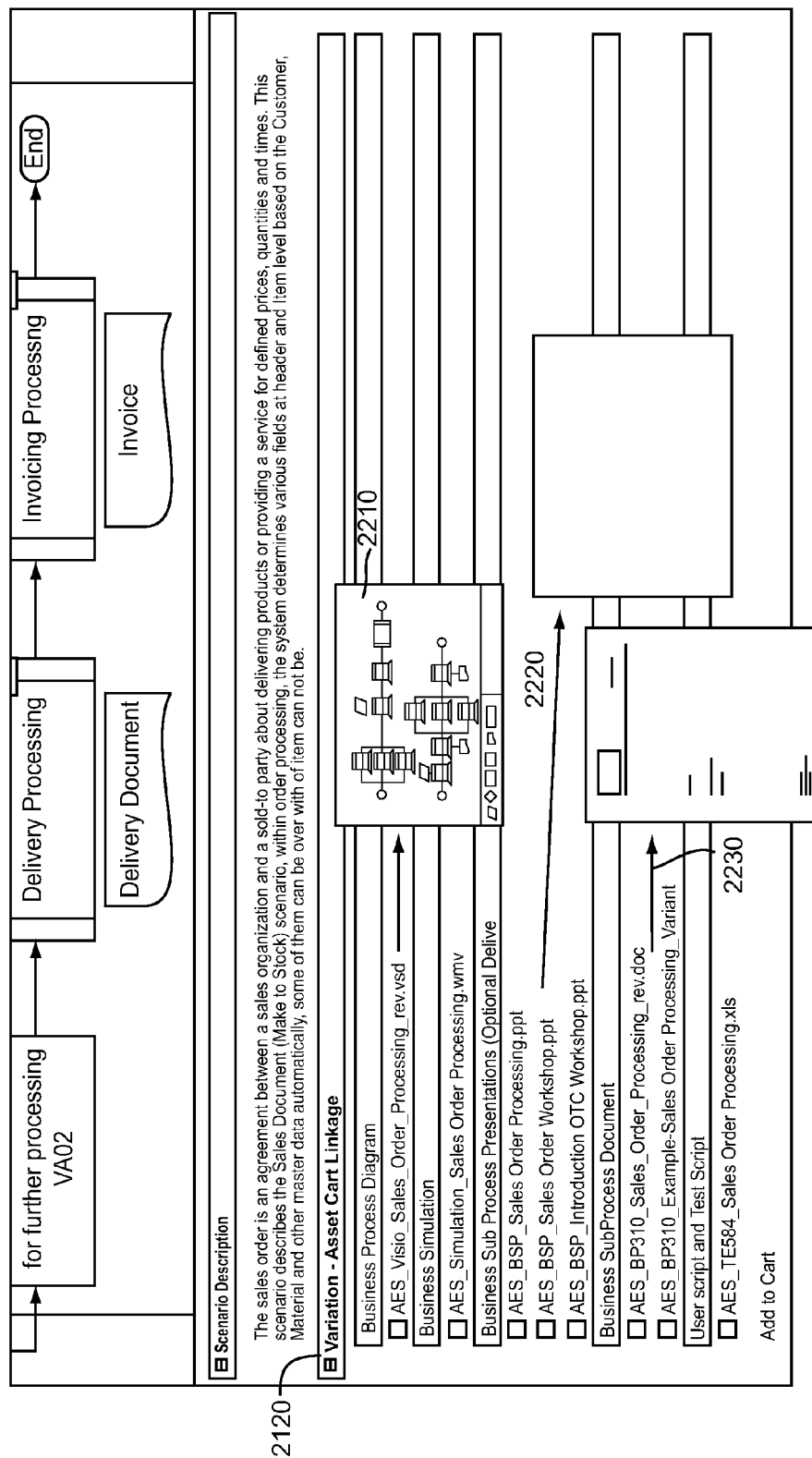
FIG. 22 is a screen shot of the available tools for the sales order processing example.

FIG. 22 provides a screen shot of some of the available tools for the sales order processing example. The user can download any of the variation-asset cart linkage 2120. These assets are business scenario documents that are related to the archetypes, processes and activity selected such as test scripts, activity training guides and configuration design documents. Downloading these assets can help dramatically accelerate implementation as the majority of the work is complete. 2210, 2220, and 2230 are visual examples of documents that can be downloaded.

Figure 23:
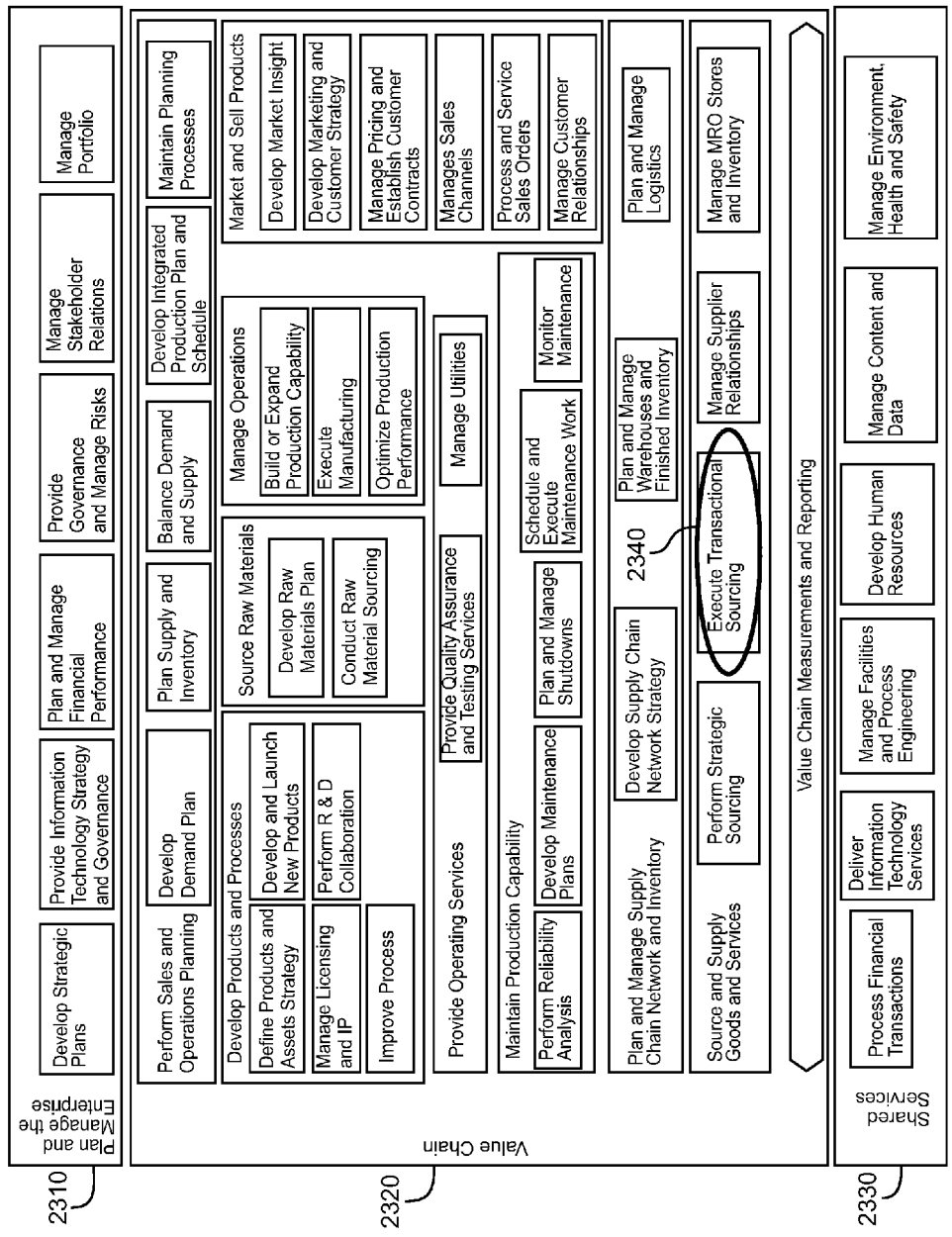
FIG. 23 is a high level screen shot of a transactional sourcing example.

FIGS. 23-27 demonstrate a second example, one of a transactional sourcing implementation. Similar to FIG. 18, FIG. 23 is a high-level snapshot of the key process that enables high performance. Once again there are three primary platforms: plan and manage the enterprise 2310, value chain 2320, and shared services 2330. Different capabilities are aligned with each platform. For this implementation example, the first step is to select execute transactional sourcing 2340 within the source and supply goods and services capability.

Figure 24:
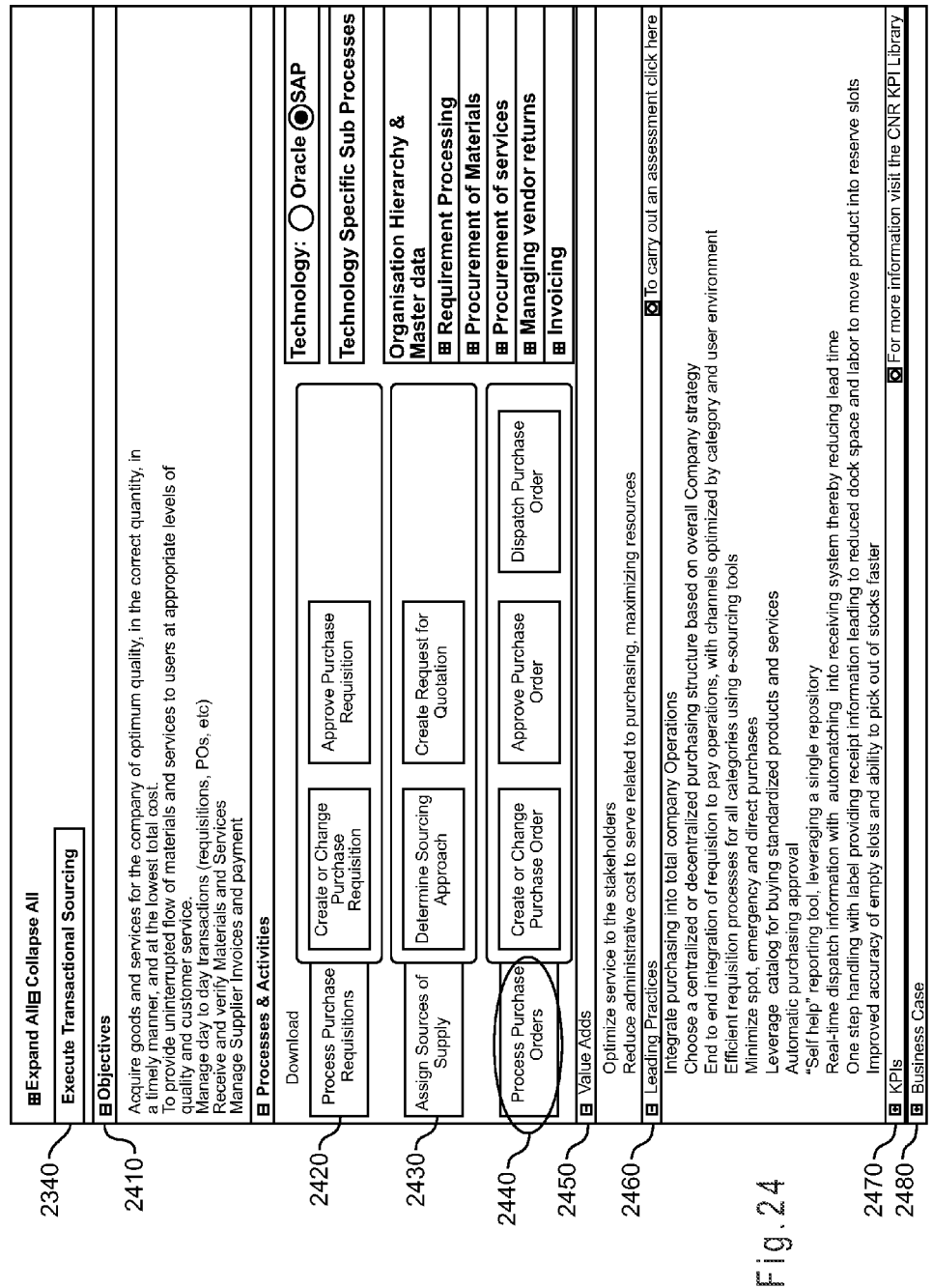
FIG. 24 is a screen shot of the process of a transactional sourcing example.

FIG. 24 provides a screen shot of the processes of a transactional sourcing example. In this step, a user may view an overview of the transactional sourcing processes 2349. The objectives 2410 of the executive transactional sourcing 2340 may be displayed. For example, some objectives include: 1. Acquire goods and services for the company of optimum quality, in the correct quantity, in a timely manner, and at the lowest total cost. 2. To provide uninterrupted flow of materials and services to users at appropriate levels of quality and customer service. 3. Manage day to day transactions such as requisitions and purchase orders.

In this example, transactional sourcing processes include: process purchase requisition 2420, assign sources of supply 2430, and process purchase orders 2440. For this example, process purchase orders 2440 is selected. Each transactional sourcing process may include several sub processes. For example, the process purchase orders 2440 process includes create or change purchase order, approve purchase order, and dispatch purchase order.

The user may also download leading practices 2460, KPI's 2470, business case 2480, and other value-adds 2450 related to transactional sourcing. Value adds 2450 may include optimizing service to the stakeholders and reducing administrator costs related to purchasing, and maximizing resources.

Leading practices 2460 may include: 1. Integrate purchasing into total company Operations. 2. Choose a centralized or decentralized purchasing structure based on overall company strategy. 3. End to end integration of requisition to pay operations, with channels optimized by category and ser environment. 4. Efficient requisition processes for all categories using e-sourcing tools. 5. Minimize spot emergency and direct purchases. 6. Leverage catalog for buying standardized products and services. 7. Automatic purchasing approval. 8. "Self help" reporting tool, leverage a single repository. 9. Real-time dispatch information with auto matching into receiving system thereby reducing lead time. 10. One step handling with label providing receipt information leading to reduced dock space and labor to move product into reserve slots. And 11. Improved accuracy of empty slots and ability to pick out of stocks faster.

To view how technology enables each of these processes, a user may drill down through the technology specific sub processes 2990. In this example, SAP is selected and therefore, the sub processes listed are related to SAP technology.

Figure 25:
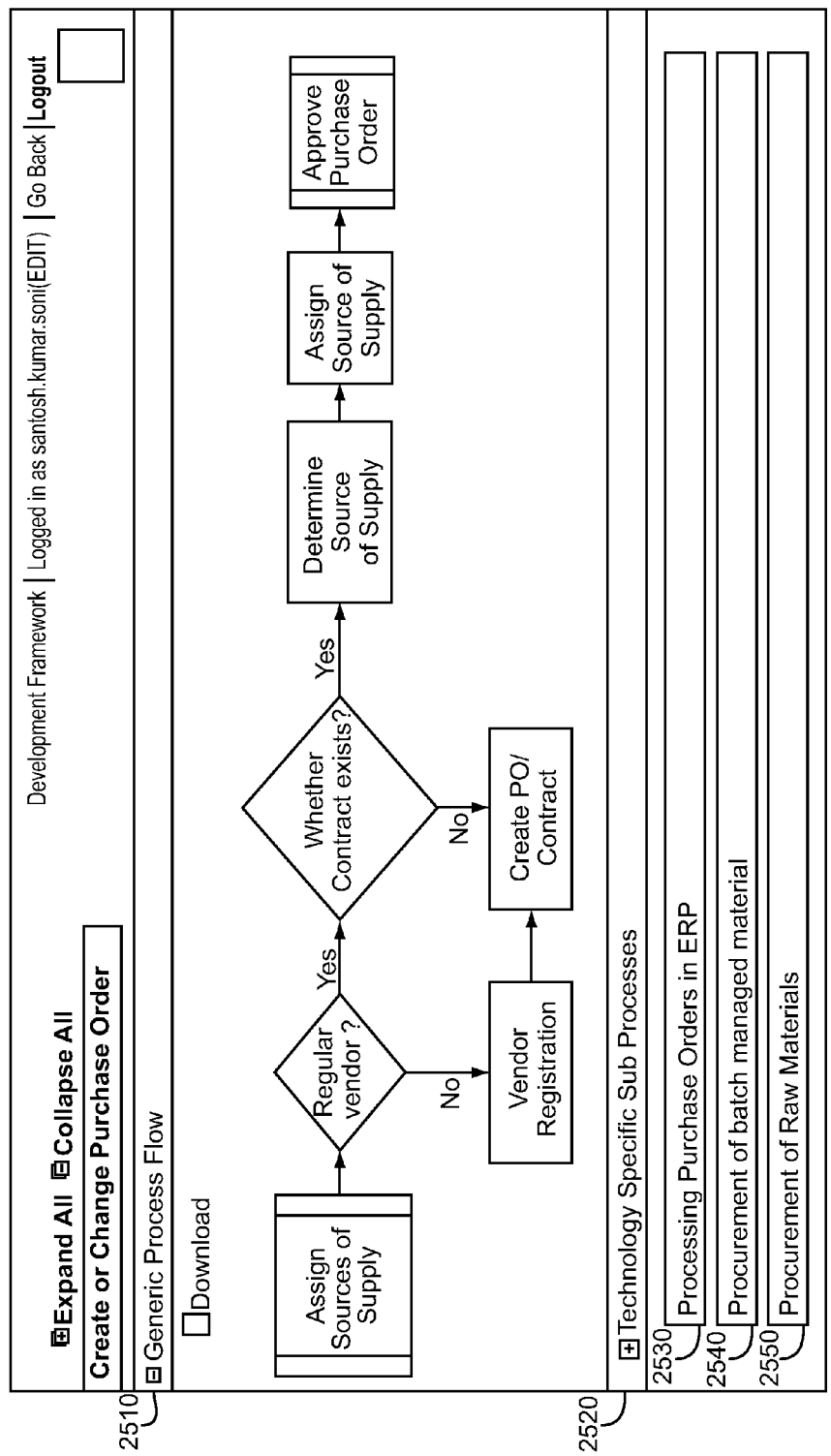
FIG. 25 is a screen shot of the create or change purchase order.

FIG. 25 is a screen shot of the "create or change purchase order" function in the transactional sourcing example. At this phase, a user can access various tools such as a process flow diagram, inputs, and outputs. The generic process flow 2510 shows a generic process flow diagram of the steps required to create or change a purchase order.

The next step is to select a technology specific sub process 2520. In this example, the technology specific sub processes 2520 include: processing purchase orders in an enterprise resource planning (ERP) system 2530, such as SAP, ORACLE, SAGE GROUP, MICROSOFT DYNAMICS, and SSA GLOBAL TECHNOLOGIES, procurement of batch managed material 2540, and procurement of raw materials 2550. For this example, processing purchase orders in ERP 2520 will be selected in order to view the technology enablement components.

Figure 26:
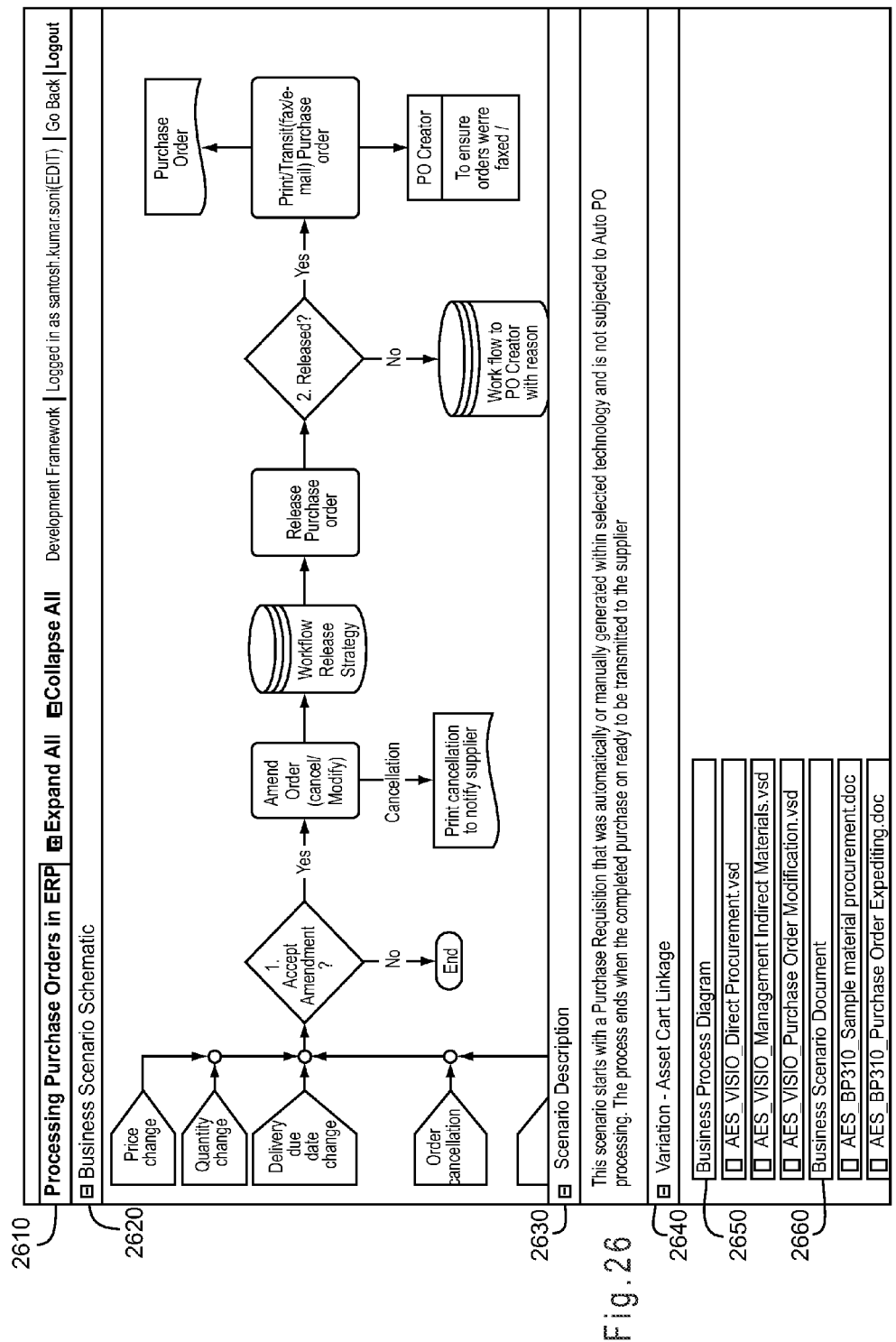
FIG. 26 is a screen shot of the technology view of the transactional sourcing example.

FIG. 26 provides a screen shot of the technology view of the transactional sourcing example. Processing purchase orders in ERP 2610 is displayed. Here, the user can view the technology specific transactional sourcing example. These details include assets such as business scenario documents, day-in-the-life scripts, and scenario/archetype presentations, simulations, and position papers.

The scenario description 2630 describes the selected scenario in detail. For this example, the scenario description 2630 reads: "The scenario starts with a purchase requisition that will automatically or manually generated within the selected technology and is not subjected to auto PO (purchase order) processing. The process ends when the completed purchase is ready to be transmitted to the supplier." variation-asset cart linkage 2640 lists the assets available. In this example, the assets available are business process diagram 2650 and business scenario document 2660. Each variation-asset 2640 may include one or more documents.

Figure 27:
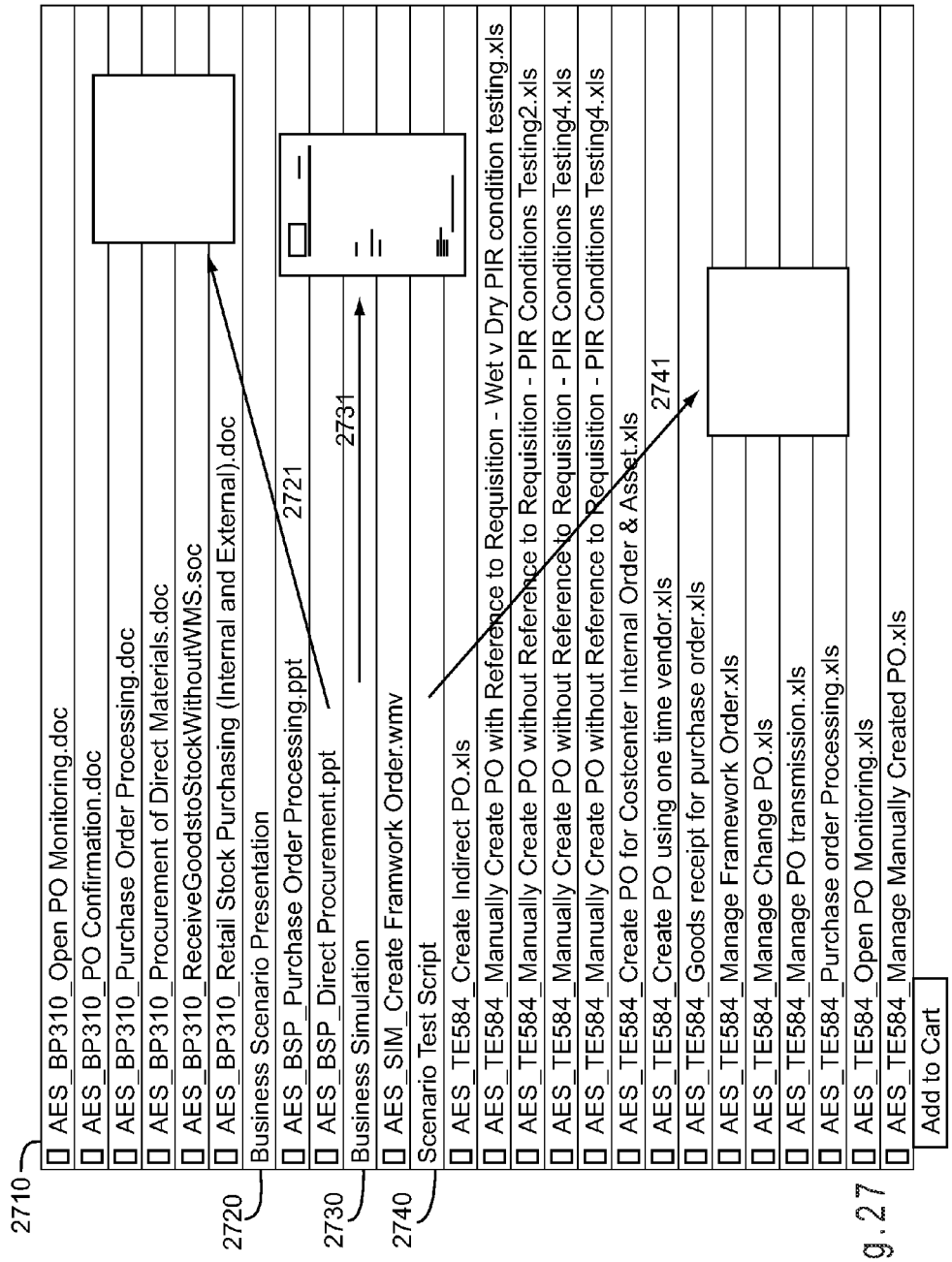
FIG. 27 is a screen shot of some of the available assets for the transactional sourcing example.

FIG. 27 provides a screen shot of some of the available assets for the transactional sourcing example. These assets are business scenario documents that are related to the archetypes, processes and activity selected such as test scripts, activity training guides and configuration design documents. Downloading these assets can help dramatically accelerate implementation as the majority of the work is complete. Here, the assets available are 2710, Business Scenario Presentation 2720, Business Simulation 2730, and Scenario Test Script 2740. 2721, 2731, and 2441 are visual examples of documents that can be downloaded.

The Business Scenario Presentation 2720 may detail the business process and the design criteria to be reviewed. The document may be used during the design phase for proving the client a view of the process and analyze and understand client specific requirements for the business process. This may be a PowerPoint document. The Business Scenario Simulation may be a video simulation of how the process needs to executed/carried out in the system of choice. This may be used in multiple ways at different stages of the project lifecycle. For example, during the Analyze and Design phase it may be used to provide an understanding to the client of how the system carries out the process and gather client specific requirements/enhancement while during the deploy phase it may be used a training module to train the users. Scenario Test Script 2740 may detail the steps that a tester must follow to complete testing, e.g., to test all the conditions, and each usually describes a test cycle. Test scripts also include the data that is used for testing. Each step of a test script may have an associated test condition that can be traced back to a requirement item. Test scripts may be documented using a table or spreadsheet format.

FIGS. 28A-M illustrate a sample of a worksheet used to map a business process to a technology process.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for mapping a process architecture to a technology architecture comprising:
   receiving, by a processor from a user device, platform selections, the platform selections corresponding to:
      a plan and manage enterprise platform having a corresponding capability area;
      a value chain platform having a corresponding capability area; and
      a shared services platform having a corresponding capability area;
   identifying, by the processor from a data store, data associated with each of the platform selections;
   receiving, by the processor from the user device, a capability selection corresponding to the respective capability area of each of the platforms;
   identifying, by the processor from the data store, data associated with each of the capability area selections;
   receiving, by the processor from the user device, a technology process selection;
   identifying, by the processor from the data store, data associated with the technology process selection; and
   transforming the data with the processor by mapping the data associated with the platform selections and the data associated with the capability area selections with the data associated with the technology process selection.

2. The method of claim 1 further comprising:
   generating, by the processor, an activity flow diagram in accordance with the mapping of the data associated with the platform selection and the data associated with the capability area selection with the data associated with the technology process selection; and displaying, by the processor, the activity flow diagram.

3. The method of claim 1 further comprising:

generating, by the processor, test scripts in accordance with the mapping of the data associated with the platform selection and the data associated with the capability area selection with the data associated with the technology process selection.

4. The method of claim 1 further comprising:

generating, by the processor, activity training guides in accordance with the mapping of the data associated with the platform selection and the data associated with the capability area selection with the data associated with the technology process selection.

5. The method of claim 1 further comprising:

generating, by the processor, design documents in accordance with the mapping of the data associated with the platform selection and the data associated with the capability area selection with the data associated with the technology process selection.

6. The method of claim 1 further comprising:

receiving, by the processor from the user device, a first technology sub-process selection; and identifying, by the processor from the data store, data associated with the first technology sub-process selection.

7. The method of claim 6 further comprising:

receiving, by the processor from the user device, a second technology sub-process selection; and identifying, by the processor from the data store, data associated with the second technology sub-process selection.

8. The method of claim 6 wherein the mapping of the data associated with the platform selection and the data associated with the capability area selection with the data associated with the technology process selection further comprises:

mapping, by the processor, the data associated with the platform selection and the data associated with the capability area selection with the data associated with the first technology sub-process selection.

9. The method of claim 1 further comprising:

receiving, by the processor from the user device, a technology schematic.

10. A non-transitory computer usable medium including a program for mapping process architecture to a technology architecture comprising:

computer program code that receives platform selections, the platform selections corresponding to:

a plan and manage enterprise platform having a corresponding capability area;

a value chain platform having a corresponding capability area; and a shared services platform having a corresponding capability area;

computer program code that identifies data associated with the platform selections;

computer program code that receives a capability selection corresponding to the respective capability area of each of the platforms;

computer program code that identifies data associated with the capability area selections;

computer program code that receives a technology process selections;

computer program code that identifies data associated with the technology process selections; and maps the data associated with the platform selections and the data associated with the capability area selection with the data associated with the technology process selection.

11. The non-transitory computer usable medium of claim 10 further comprising:

a computer program code that generates an activity flow diagram in accordance with the map of the data associated with the platform selection and the data associated with the capability area selection with the data associated with the technology process selection.

12. The non-transitory computer usable medium of claim 10 further comprising:

computer program code that generates test scripts in accordance with the map of the data associated with the platform selection and the data associated with the capability area selection with the data associated with the technology process selection.

13. The non-transitory computer usable medium of claim 10 further comprising:

computer program code that generates activity training guides in accordance with the map of the data associated with the platform selection and the data associated with the capability area selection with the data associated with the technology process selection.

14. The non-transitory computer usable medium of claim 10 further comprising:

computer code that generates design documents in accordance with the map of the data associated with the platform selection and the data associated with the capability area selection with the data associated with the technology process selection.

15. The non-transitory computer usable medium of claim 10 further comprising:

computer program code that receives a first technology sub-process selection; and computer program code that identifies data associated with the first technology sub-process selection.

16. The non-transitory computer usable medium of claim 15 further comprising:

computer program code that receives a second technology sub-process selection; and computer program code that identifies data associated with the second technology sub-process selection.

17. The non-transitory computer usable medium of claim 15 wherein the mapping of the data associated with the platform selection and the data associated with the capability area selection with the data associated with the technology process selection further comprises:

computer program code that maps the data associated with the platform selection and the data associated with the capability area selection with the data associated with the first technology sub-process selection.

18. The non-transitory computer usable medium of claim 10 further comprising:

computer program code that receives a technology schematic.

19. A computer implemented system for mapping process architecture to a technology architecture comprising:

a platform selection module, operatively coupled to a processor of the computer implemented system, and configured to receive data associated with a plurality of platforms, the platforms including:

a. a plan and manage enterprise platform having a corresponding capability area;

a value chain platform having a corresponding capability area; and a shared services platform having a corresponding capability area;

a capability selection module, operatively coupled to the processor, and configured to receive data associated with the respective capability area of each of the platforms;

a technology process module, operatively coupled to the processor, and configured to receive data associated with a technology; and a mapping module, operatively coupled to the processor, and wherein the mapping module maps data associated with the platform selection module and the data associated with the capability area selection module with the data associated with the technology process selection module.

20. The system of claim 19 further comprising:

an activity flow module that generates an activity flow diagram in accordance with the mapping module.

21. The system of claim 19 further comprising:

a test module that generates test scripts in accordance with the mapping module.

22. The system of claim 19 further comprising:

an activity training module that generates activity training guides in accordance with the mapping module.

23. The system of claim 19 further comprising:

a design module that generates design documents in accordance with the mapping module.

24. The system of claim 19 wherein the technology process module further comprises:

receiving data associated with at least one technology sub-process.

25. The system of claim 19 further comprising:

a schematic module for receiving data associated with a technology schematic.

\* \* \* \* \*

UNITED STATES PATENT AND TRADEMARK OFFICE
CERTIFICATE OF CORRECTION

PATENT NO. : 8,806,424 B1
APPLICATION NO. : 12/970324
DATED : August 12, 2014
INVENTOR(S) : Subhashish Ray et al.

Page 1 of 1

It is certified that error appears in the above-identified patent and that said Letters Patent is hereby corrected as shown below:

In the Claims

In column 14, claim 19, line 62, before "and manage enterprise" replace "a. a plan" with --a plan--.

Signed and Sealed this
Seventh Day of April, 2015

Michelle K. Lee
*Director of the United States Patent and Trademark Office*